United States Patent
Fulkerson et al.

(10) Patent No.: US 10,989,316 B2
(45) Date of Patent: Apr. 27, 2021

(54) DENSE PHASE PUMP WITH EASILY REPLACEABLE COMPONENTS

(71) Applicant: NORDSON CORPORATION, Westlake, OH (US)

(72) Inventors: Terrence M. Fulkerson, Brunswick Hills, OH (US); Benjamin J. Becker, Rocky River, OH (US); Donna Campbell, Huron, OH (US); Nicholas Klasovsky, Amherst, OH (US); Joseph G. Schroeder, North Royalton, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/151,427

(22) Filed: May 10, 2016

(65) Prior Publication Data
US 2016/0252184 A1    Sep. 1, 2016

Related U.S. Application Data

(62) Division of application No. 13/837,169, filed on Mar. 15, 2013, now abandoned.

(51) Int. Cl.
| | |
|---|---|
| *F16K 7/07* | (2006.01) |
| *B05B 7/14* | (2006.01) |
| *F04B 15/02* | (2006.01) |
| *F04B 53/10* | (2006.01) |
| *F04B 53/20* | (2006.01) |

(Continued)

(52) U.S. Cl.
CPC .............. *F16K 7/07* (2013.01); *B05B 7/1459* (2013.01); *F04B 15/02* (2013.01);
(Continued)

(58) Field of Classification Search
CPC .......... F16K 7/07; F16K 7/075; F16K 15/044; F04B 15/02; F04B 43/0054; F04B 43/08;
(Continued)

(56) References Cited

U.S. PATENT DOCUMENTS

| | | |
|---|---|---|
| 237,312 A | 2/1881 | Noyes |
| 276,299 A | 4/1883 | Starr |
| (Continued) | | |

FOREIGN PATENT DOCUMENTS

| | | |
|---|---|---|
| CN | 201173306 Y | 12/2008 |
| CN | 101796300 A | 8/2010 |
| (Continued) | | |

OTHER PUBLICATIONS

Orbit Website Search, Oct. 28, 2014, 1/1 Designs-Questel Pinch Valve, shown in pp. 1-16.
(Continued)

*Primary Examiner* — Kevin F Murphy
*Assistant Examiner* — Jonathan J Waddy
(74) *Attorney, Agent, or Firm* — BakerHostetler

(57) ABSTRACT

A dense phase pump has two housings that are attached together using a single releasable fastener. The fastener can be released to allow the two housings to be separated thereby providing access to replaceable components. The replaceable components may include one or more pinch valves or one or more barrier elements. A pinch valve for a dense phase pump has a shape or profile for aligning the pinch valve when the pinch valve is installed in a pinch valve body. The pinch valve optionally has two end flanges, with each end flange having a shaped periphery. The two end flanges may have the same size and shape so that the pinch valve can be installed in either of two orientations that are inverse. A dense phase pump has a pump chamber that can be purged by purge gas that enters the pump off-axis from a purge path axis.

22 Claims, 17 Drawing Sheets

(51) Int. Cl.
*F04B 43/08* (2006.01)
*F04B 43/00* (2006.01)
*F16K 15/04* (2006.01)

(52) U.S. Cl.
CPC .......... *F04B 43/0054* (2013.01); *F04B 43/08* (2013.01); *F04B 53/10* (2013.01); *F04B 53/20* (2013.01); *F16K 15/044* (2013.01); *Y10T 137/0441* (2015.04); *Y10T 137/85978* (2015.04)

(58) Field of Classification Search
CPC ...... F04B 53/10; F04B 53/20; F04B 43/0072; A61M 39/28; B05B 7/1459; Y10T 137/0441; Y10T 137/85978
USPC ........................................................ 251/5, 4
See application file for complete search history.

(56) References Cited

U.S. PATENT DOCUMENTS

| | | | |
|---|---|---|---|
| 318,412 A | 5/1885 | Brown | |
| 348,922 A | 9/1886 | Mueller et al. | |
| 403,049 A | 5/1889 | Jones | |
| 424,161 A | 3/1890 | Adams | |
| 456,818 A | 7/1891 | Herrington | |
| 464,063 A | 12/1891 | Collom | |
| 486,061 A | 11/1892 | Bache | |
| 523,251 A | 7/1894 | Utley | |
| D94,288 S | 1/1935 | Teahen | |
| 2,606,500 A | 8/1952 | Schmidt | |
| 2,627,874 A * | 2/1953 | Johnson | F16K 7/07 251/5 |
| 3,007,416 A * | 11/1961 | Childs | A61M 1/1037 128/DIG. 3 |
| 3,047,008 A * | 7/1962 | Clarkson | F16K 7/07 137/315.07 |
| 3,064,997 A * | 11/1962 | Karlsson | F16L 13/004 285/22 |
| D210,106 S | 2/1968 | Jerabek | |
| D210,706 S | 4/1968 | Zalis | |
| 3,490,732 A * | 1/1970 | Leroy | F16K 15/14 251/5 |
| 3,895,631 A * | 7/1975 | Buckles | A61M 39/28 604/132 |
| 4,023,772 A | 5/1977 | Ratelband | |
| D244,943 S | 7/1977 | Balmer, Jr. | |
| 4,108,418 A * | 8/1978 | Ensign | F16K 7/07 137/375 |
| 4,245,672 A * | 1/1981 | Schott Malo | E21B 21/10 137/331 |
| 4,268,005 A | 5/1981 | Raftis et al. | |
| 4,312,528 A | 1/1982 | Hall et al. | |
| 4,372,528 A | 2/1983 | Raftis | |
| 4,373,877 A | 2/1983 | Brown | |
| D281,482 S | 11/1985 | Suzuki | |
| 4,713,171 A * | 12/1987 | Polaschegg | A61M 1/30 210/110 |
| 4,742,593 A | 5/1988 | Kallenbach | |
| 5,078,361 A | 1/1992 | Nordman | |
| 5,261,610 A | 11/1993 | Waryu et al. | |
| 5,297,773 A * | 3/1994 | Collins | F16K 7/063 138/141 |
| D355,584 S | 2/1995 | Clivio | |
| 5,395,352 A * | 3/1995 | Penny | A61M 25/1025 137/606 |
| D368,299 S | 3/1996 | Ratledge | |
| D372,034 S | 7/1996 | Handzel et al. | |
| 6,047,943 A * | 4/2000 | Hussey | F16K 7/075 251/358 |
| D424,167 S | 5/2000 | Yuen et al. | |
| 6,102,361 A * | 8/2000 | Riikonen | F16K 7/07 251/5 |
| 6,105,545 A | 8/2000 | Breidenbach | |
| D436,520 S | 1/2001 | Bulman | |
| 6,179,221 B1 | 1/2001 | Goldberg et al. | |
| D443,811 S | 6/2001 | Tisbo | |
| 6,278,061 B1 | 8/2001 | Daoud | |
| 6,619,563 B2 | 9/2003 | van der Steur | |
| D486,501 S | 2/2004 | Hawkins et al. | |
| 6,705,545 B1 | 3/2004 | Sroka et al. | |
| D504,307 S | 4/2005 | Dayan | |
| D504,806 S | 5/2005 | Basaran et al. | |
| D508,199 S | 8/2005 | Winig et al. | |
| 6,959,905 B2 | 11/2005 | Bush | |
| D524,911 S | 7/2006 | Thompson et al. | |
| 7,100,445 B2 | 9/2006 | Morell | |
| D531,643 S | 11/2006 | Tischler et al. | |
| D537,709 S | 3/2007 | Thorner | |
| D545,561 S | 7/2007 | Vandecasteele | |
| D546,920 S | 7/2007 | Fulkerson | |
| D557,118 S | 12/2007 | Linginfelter | |
| D563,207 S | 3/2008 | Kawazoe | |
| D583,651 S | 12/2008 | Kawazoe | |
| D597,629 S | 8/2009 | Fulkerson | |
| D603,480 S | 11/2009 | Ibanez Sapina | |
| D619,624 S | 1/2010 | Iwagoshi et al. | |
| D617,421 S | 6/2010 | Fulkerson | |
| 7,775,501 B2 * | 8/2010 | Kees | F16K 7/065 251/5 |
| 7,997,878 B2 | 8/2011 | Fulkerson | |
| D649,561 S | 11/2011 | Bauck et al. | |
| D655,314 S | 3/2012 | Yoshimura et al. | |
| D659,166 S | 5/2012 | Koyama et al. | |
| D680,134 S | 4/2013 | Fordyce et al. | |
| 8,424,920 B2 | 4/2013 | Gilbreath et al. | |
| D692,100 S | 10/2013 | Freeth | |
| 8,578,671 B2 | 11/2013 | Labrecque et al. | |
| D726,873 S | 4/2015 | Fulkerson et al. | |
| 2002/0139301 A1 | 10/2002 | Attinoto et al. | |
| 2005/0158187 A1 | 7/2005 | Fulkerson et al. | |
| 2006/0193704 A1 | 8/2006 | Simontacchi | |
| 2006/0219807 A1 | 10/2006 | Fulkerson et al. | |
| 2009/0232585 A1 | 9/2009 | Gilbreath et al. | |
| 2010/0293882 A1 | 11/2010 | Labrecque et al. | |

FOREIGN PATENT DOCUMENTS

| | | | |
|---|---|---|---|
| CN | 101960199 A | 1/2011 | |
| DE | 1486090 A1 | 9/1969 | |
| DE | 2511306 A1 | 9/1975 | |
| DE | 202006014550 U1 | 2/2007 | |
| DE | 102007006764 B3 | 4/2008 | |
| DE | 202008015865 U1 * | 2/2009 | F16K 7/07 |
| DE | 102007049219 A1 | 4/2009 | |
| DE | 202004021629 U1 | 8/2009 | |
| DE | 202004021621 U1 | 10/2009 | |
| DE | 102011004035 A1 | 8/2012 | |
| EP | 0948971 A1 * | 10/1999 | A61M 39/284 |
| EP | 1035360 B1 | 8/2004 | |
| EP | 1518091 A1 | 3/2005 | |
| EP | 1519091 A2 | 3/2005 | |
| EP | 1772195 A2 | 4/2007 | |
| EP | 3181238 B1 | 10/2019 | |
| GB | 1082674 A | 9/1967 | |
| JP | 58-189862 U | 12/1983 | |
| JP | 59-186565 U | 12/1984 | |
| JP | 2007-512947 A | 5/2007 | |
| WO | 20051005060 A2 | 1/2005 | |
| WO | 2005051549 A1 | 6/2005 | |
| WO | 2008/098604 A1 | 8/2008 | |
| WO | 2009022227 A2 | 2/2009 | |
| WO | 2009047602 A1 | 4/2009 | |
| WO | 20090111081 | 9/2009 | |
| WO | 2012112436 A1 | 8/2012 | |

OTHER PUBLICATIONS

European Patent Application No. 14159865.6: European Search Report dated May 13, 2014.
Chinese Patent Application No. 201410098892.3: First Office Action dated Jun. 1, 2017, 12 pages.

(56) References Cited

OTHER PUBLICATIONS

European Patent No. 17152724.5; Extended Search Report; dated May 10, 2017; 6 pages.
European Patent No. 17152721.1; Extended Search Report; dated May 18, 2017; 8 pages.
Observations by third parties Mailed on Nov. 21, 2017 for EP Application No. 17152721.
English Translation of JP Office Action dated Dec. 21, 2017 for JP Application No. 2014051544.
EP Office Action dated Jun 7, 2018 for EP Application No. 17152724.
EP Office Action dated Sep. 4, 2018 for EP Application No. 17152724.
English Translation of CN Office Action dated Feb.. 2, 2019 for CN Application No. 201710952284.
English Translation of JP Office Action dated Jun. 6, 2019 for JP Application No. 2018114121.
"Prodigy HDLV Pump" Manual; Nordson Corp., 2007.
Applikationspumpe OptiSpray DPP01—Betriebsanleitung und Ersatzteilliste 2008.
Betriebsanleitung Prodigy® HDLV® Pump Pinch Valve Replacement, Nordson Corporation 2009.
Betriebsanleitung Prodigy® High—Capacity HDLV® Powder Transfer Pump, Nordson Corporation 2008.
Betriebsanleitung und Ersatzteilliste—OptiSpray DPP01, 2008.
OptiSpray DPP01 Dense phase pump, Operating instructions and spare parts list, 2006.
Quetschventile VZQA, Product Information Brochure, Festo, 0712020, 15 pages (corresponds to Pinch valves VZQA).
Pinch valves VZQA, Product Information Brochure, Festo, Jul. 2020, 16 pages (corresponds to Quetschventile VZQA).

* cited by examiner

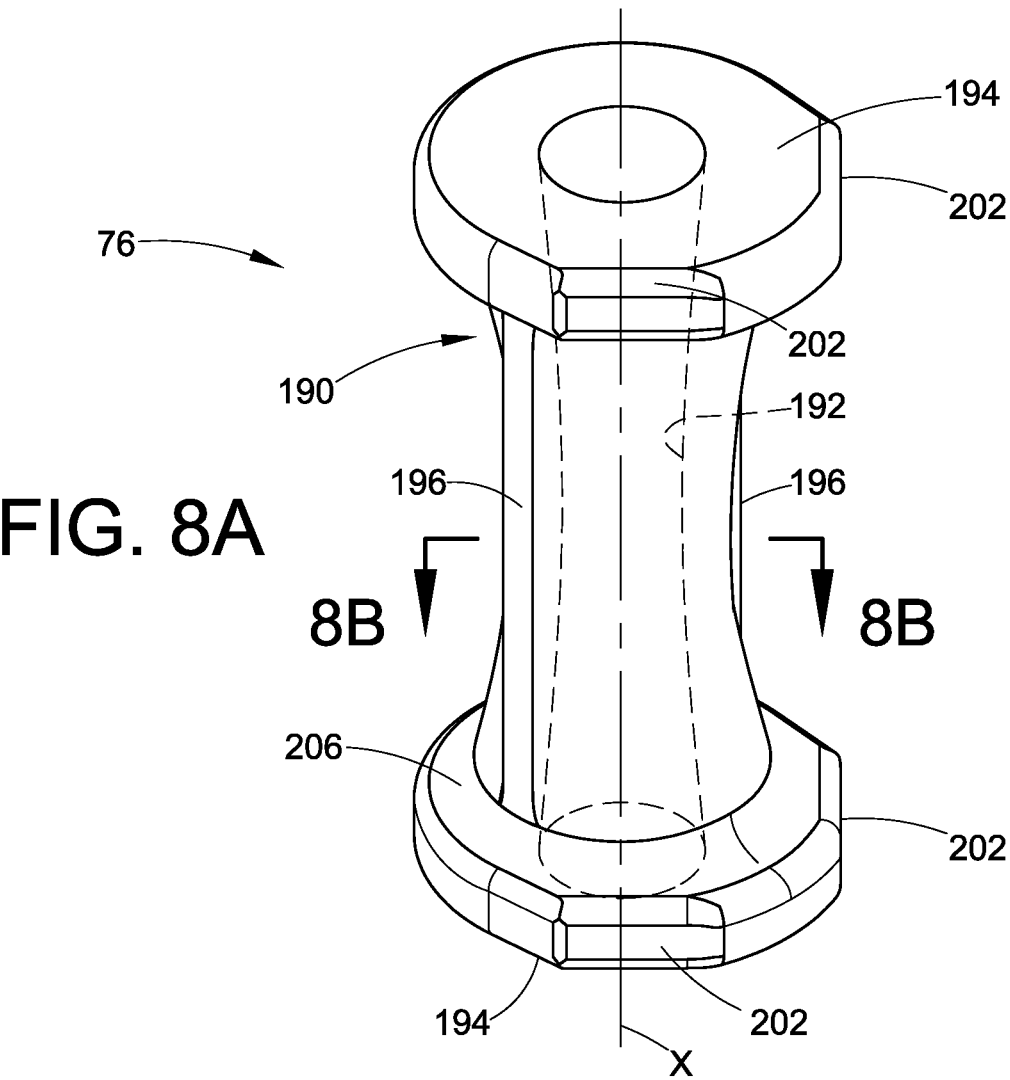
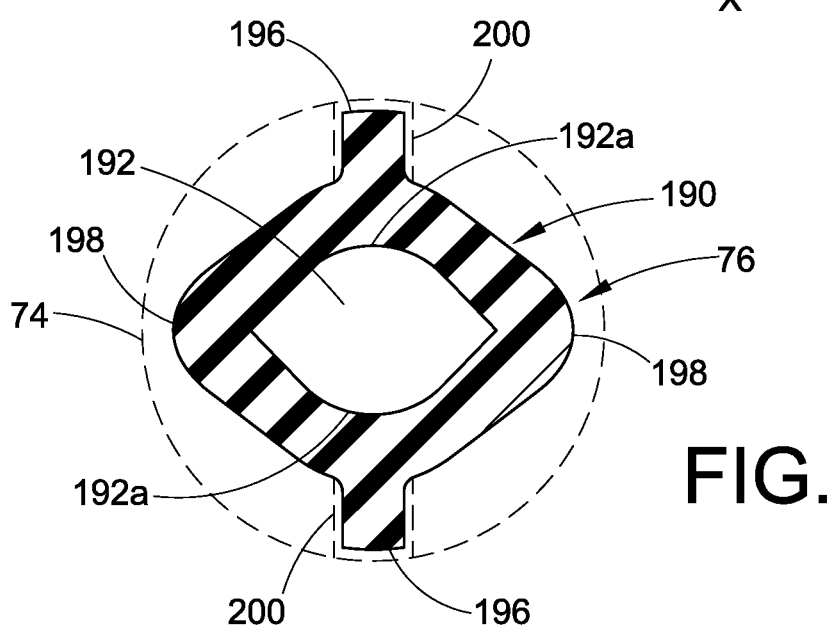

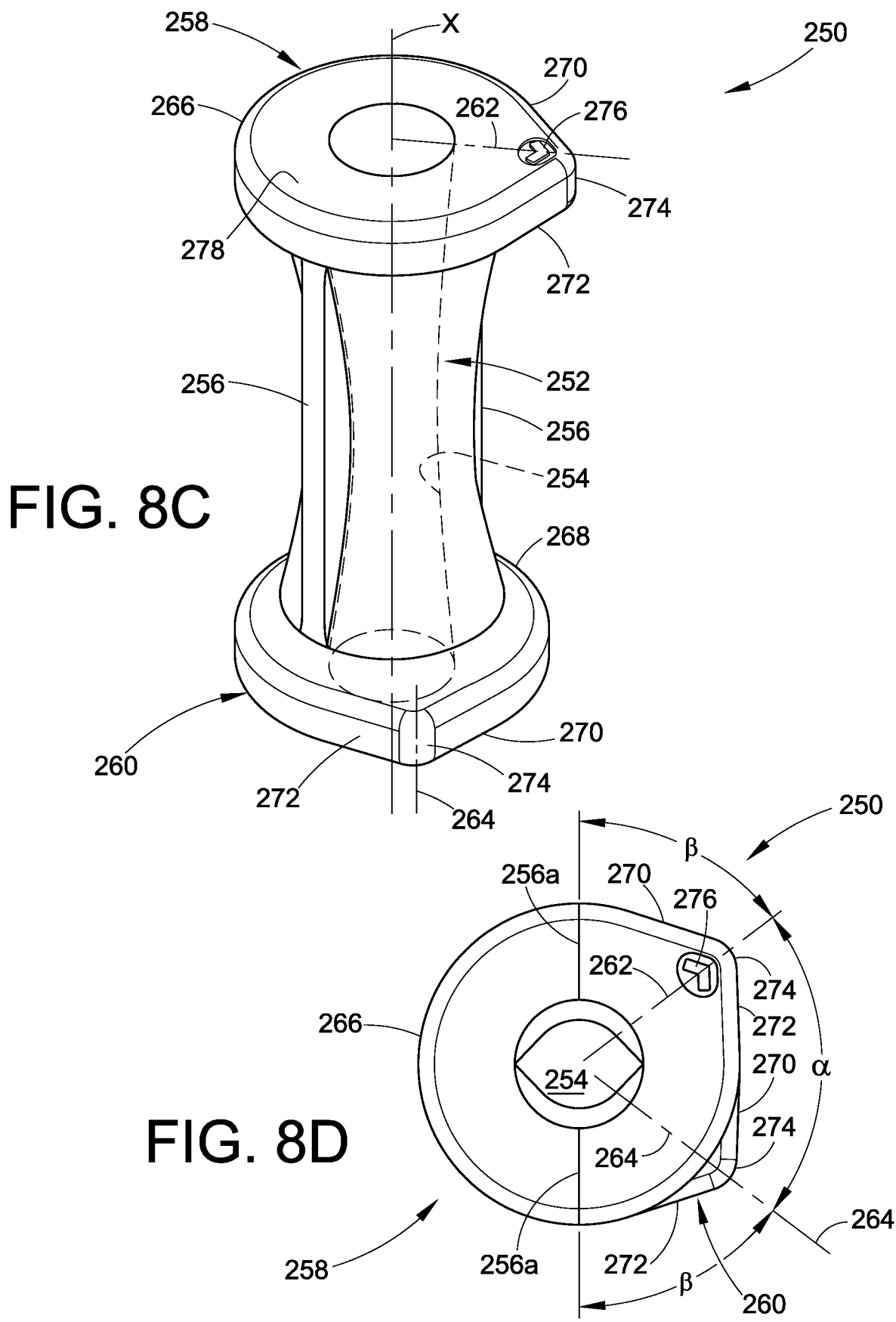

_US 10,989,316 B2_

DENSE PHASE PUMP WITH EASILY REPLACEABLE COMPONENTS

CROSS-REFERENCE TO RELATED APPLICATIONS

This application is a Divisional of U.S. patent application Ser. No. 13/837,169, filed Mar. 15, 2013, and published as U.S. Patent App. Pub. No. 2014/0261739, published Sep. 18, 2014, which is incorporated by reference herein in its entirety.

TECHNICAL FIELD OF THE DISCLOSURE

The inventions relate generally to material application systems that are used for spraying powder coating material onto a work piece or object. More particularly, the inventions relate to material application pumps, for example, dense phase pumps.

BACKGROUND OF THE DISCLOSURE

A material application device is used to apply powder coating material to an object, part or other work piece or surface. A material application device is also referred to herein as a spray gun. The powder coating material can be delivered from a powder pump to a spray gun in dilute phase or dense phase. Dilute phase delivery refers to a powder flow or stream that is a lean mixture, or in other words has a higher ratio of flow air to powder. Dilute phase powder pumps are most commonly used in the form of a Venturi style pump that uses a larger volume of air to draw powder from a supply and push the powder to the spray gun. Dense phase delivery refers to a powder stream that is a rich mixture, or in other words has a lower ratio of flow air to powder. Dense phase pumps are commonly used in the form of a pump chamber that uses pressure to fill and empty a pump chamber but with a lower flow air volume, referred to hereinafter as flow air. Because dense phase delivery systems use less flow air, the powder hoses can be made smaller in diameter compared with powder hoses used with dilute phase delivery systems.

An example of a dense phase pump is described in U.S. Pat. No. 7,997,878 (the "878 patent" hereinafter) the entire disclosure of which is fully incorporated herein by reference.

SUMMARY OF THE DISCLOSURE

In an embodiment presented in this disclosure, a dense phase pump includes a first housing and a second housing that is attached to the first housing by a single releasable fastener. In a more particular embodiment, the second housing receives one or more replaceable components. In another embodiment the replaceable components may include a pinch valve or a barrier element such as, for example, a barrier filter, or both.

A method for removing or replacing a replaceable component, for example a pinch valve or barrier element, that is disposed in a dense phase pump is also provided, and in an exemplary embodiment the method includes releasing a single releasable fastener to provide access to the replaceable component.

In another embodiment presented herein, a pinch valve has an annular body with first and second end flanges. One or both of the end flanges has a non-circular profile for aligning the pinch valve when the pinch valve is installed in a pinch valve housing or valve body.

In another embodiment presented in this disclosure, a dense phase pump includes a pump housing having at least one gas permeable member that can be purged from one end of the gas permeable member along a longitudinal axis of the gas permeable member, and the pump housing has a purge inlet such that purge air enters the pump housing along an axis that is transverse the gas permeable member longitudinal axis.

In another embodiment, a pinch valve housing includes non-circular pinch valve with two end flanges that are radially offset from each other.

In another embodiment, a pinch valve includes alignment indicia for indicating correct orientation of the pinch valve when the pinch valve is assembled into a pinch valve housing.

In another embodiment, a dense phase pump having two or more housings that are assembled together has alignment indicia on exterior surfaces of the housings.

These and other aspects and advantages of the present invention will be appreciated and understood by those skilled in the art from the following detailed description of the exemplary embodiments in view of the accompanying drawings.

BRIEF DESCRIPTION OF THE DRAWINGS

FIGS. 8A and 8B are isometric and lateral cross-sectional views of a pinch valve, FIGS. 8C and 8D illustrate another embodiment of a pinch valve, in isometric and plan views.

DETAILED DESCRIPTION OF EXEMPLARY EMBODIMENTS

Figure 1:
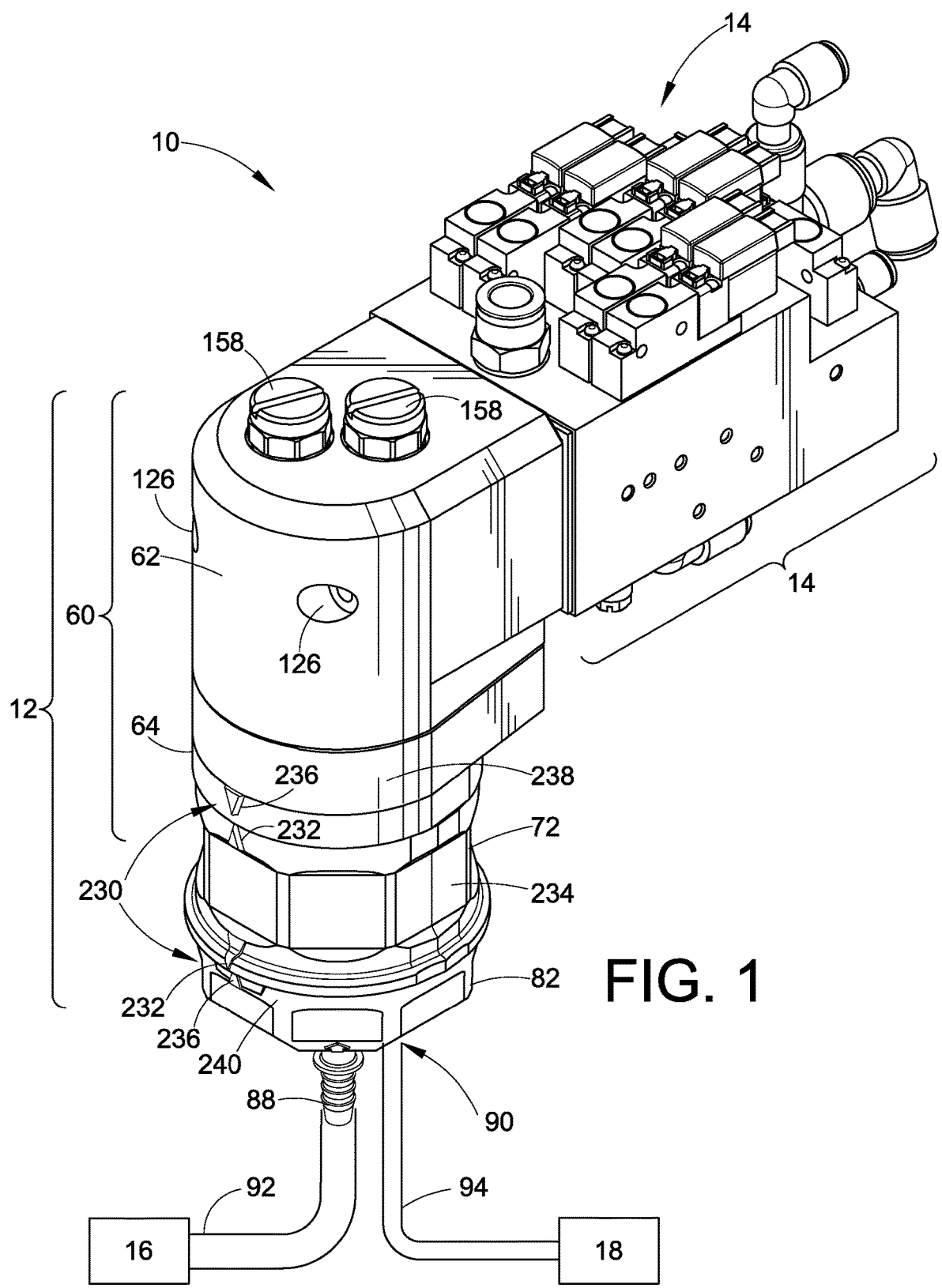
FIG. 1 is an isometric view of a dense phase pump and manifold assembly that may be used with the present inventions.

Although the inventions are described in terms of exemplary embodiments of a dense phase pump such as embodiments that are described in the 878 patent, this is but one example of a dense phase pump that may utilize one or more of the inventions. The disclosure and inventions herein are not limited to a strict definition of "dense phase", but rather we refer to a dense phase pump as being one in which powder coating material is pulled into a pump chamber by negative pressure and pushed out of the pump chamber by positive pressure, by utilization of a gas permeable filter. Also, while the dense phase pump described in the 878 patent has found excellent commercial success, we have developed modifications and features that improve the serviceability of wear parts, and also that simplify assembly and of the pump. However, it is important to note that the inventive concepts and improvements herein may be used with additional or alternative dense phase pump designs other than what is described herein or in the 878 patent.

Directional references herein to axial and radial are relative directionally to a central longitudinal axis X of the indicated element, for example the dense phase pump (FIG. 2), unless otherwise noted by context or description. A reference numeral in parentheses indicates that the related element is further described in an additional detailed embodiment hereinbelow.

A first inventive concept provides a dense phase pump that is modular in design in that the pump is an assembly of two or more housings that can be conveniently assembled and separated so as to provide access to one or more replaceable components or parts. By replaceable components we mean parts that tend to wear out over time but such wear does not render the overall pump useless. By simply replacing these parts the pump can continue to be used in service.

In an embodiment of the first concept, a dense phase pump has two housings that are attached together using a single releasable fastener. In this way, the single fastener can be released so as to allow the two housings to be separated thereby providing access to the replaceable components. In a further exemplary embodiment, the replaceable components may include one or more pinch valves or one or more barrier elements or both. Additional embodiments of this first concept are presented herein. An embodiment of a method for replacing replaceable component in a dense phase pump is also presented herein.

A second inventive concept provides in an embodiment a pinch valve that has a shape or profile for aligning the pinch valve when the pinch valve is installed in a pinch valve body. In another embodiment of the second concept, a pinch valve has two end flanges, with each end flange having a shaped periphery for aligning the pinch valve when the pinch valve is installed in a pinch valve body. In another embodiment, the two end flanges may have the same size and shape so that the pinch valve can be installed in either of two longitudinal orientations that are inverse with respect to each other. In another embodiment, the end flanges may be radially offset from one another relative to the longitudinal axis of the pinch valve body. In another embodiment, the two end flanges may have a non-circular shape. In another embodiment, the two end flanges may have alignment indicia thereon. Additional embodiments of this second concept are presented herein.

A third inventive concept provides in an embodiment a dense phase pump having a pump chamber that can be purged by a purge gas flow that enters the pump off-axis from a purge path through the pump chamber. In another embodiment, a dense phase pump includes a pump housing having at least one gas permeable member that can be purged from one end of the gas permeable member along a longitudinal axis of the gas permeable member, and the pump housing has a purge inlet such that purge air enters the pump housing along an axis that is transverse the gas permeable member longitudinal axis. Additional embodiments of this third concept are presented herein.

With reference then to FIG. 1, a dense phase pump and manifold assembly 10 includes a dense phase pump 12 and a manifold 14. The dense phase pump 12 may be designed and operated generally in accordance with the 878 patent except as otherwise noted herein, for example, but alternatively many other dense phase pump designs may be used as needed. For purposes of the present disclosure, it is sufficient to understand that the dense phase pump pulls powder coating material from a coating material supply 16 and pushes the powder coating material to a spray gun 18. The supply 16 may be any suitable apparatus and design known in the art or later developed. A common example is a hopper that may have a fluidized bed, or alternatively, powder coating material can be supplied from a box or container or other suitable supply. The spray gun 18 may also be any suitable apparatus and design such that the spray gun receives a dense phase powder flow and produces a spray pattern that is suitable for a coating operation. An example of a suitable dense phase spray gun is the PRODIGY® model spray gun available from Nordson Corporation, Westlake, Ohio. Alternatively, many other dense phase spray guns known in the art or later developed may be used.

Figure 1A:
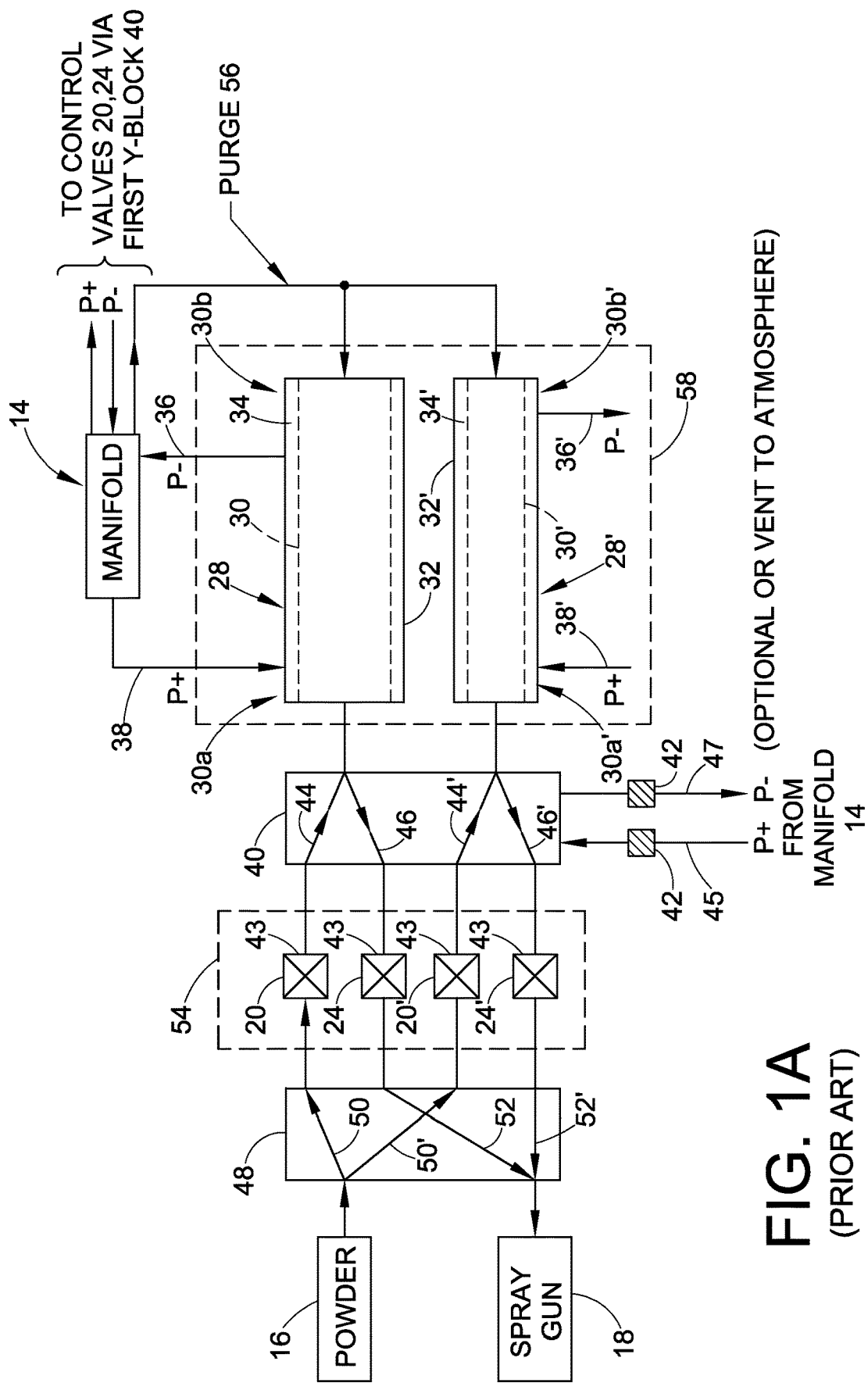
FIG. 1A is a functional block diagram of the dense phase pump embodiment of FIG. 1.

FIG. 1A illustrates in simplified schematic form the basic parts of a dense phase pump 12, for example the pump disclosed in the 878 patent. A first control valve 20 is used to control the flow of powder coating material from the coating material supply 16 into an inlet 22 of the pump 12. A second control valve 24 is used to control the flow of powder coating material from an outlet 26 of the pump 12 to the spray gun 18. The pump 12 may be further realized using a pump chamber 28. The pump chamber 28 includes a gas permeable filter 30 that is disposed in a filter pressure chamber 32 with an annulus 34 that surrounds the gas permeable filter 30. Powder coating material is pulled into the pump chamber 28 by opening the first control valve 20 and applying negative pressure 36 ($P^-$) to the annulus 34. Powder coating material is pushed out of the pump chamber by closing the first control valve 20, removing the negative pressure opening the second control valve 24 and applying positive pressure 38 ($P^+$) to the annulus 34. The first and second control valves 20, 24 thus are operated out of phase with each other, as is the application of the positive and negative pressures $P^+$ and $P^-$. In the exemplary embodiments herein, the control valves 20, 24 may each be realized in the form of a pneumatic pinch valve.

For a pump 12 such as described in the 878 patent, powder coating material flows into and out of one end 30a of the gas permeable filter 30. Therefore, a first powder flow Y-block 40 is used to provide inlet and outlet powder flow branches 44, 46 for the control valves 20, 24.

The pinch valves 20, 24 may comprise an elastic material as described below, and in their natural relaxed condition are in an open position. When positive pressure is applied to the pinch valve pressure chamber 43 associated with a pinch valve, the external pressure acting on the pinch valve body compresses or pinches the valve closed. In an exemplary embodiment, when the pressure is released (the pressure chamber may be vented to atmosphere to release the pressure) the pinch valve opens due to the natural elastic properties of the pinch valve body. Alternatively, negative pressure optionally may be applied to the pressure chamber 43 to further assist the pinch valve to return to the open position.

When the control valves 20, 24 are realized in the form of a pneumatic pinch valve as described in the 878 patent, each pinch valve is disposed in a respective pinch valve pressure chamber 43 in the pinch valve body (54). This allows the use of positive pressure 45 and optionally negative pressure 47 to be applied to the pinch valve pressure chamber 43 to close and open the pinch valve. Note that optionally each pinch valve 20, 24 may have its own separately controlled pressure to its associated pinch valve pressure chamber 43 to operate each pinch valve. In order to apply pressure to the pinch valve pressure chambers, a first barrier element or barrier filter 42 may be used in the pressure passage. A barrier element functions to prevent powder coating material from being drawn or blow back into a pressure source in the manifold 14 or into the ambient environment. An example of a barrier element is a porous filter that allows air to pass through but blocks a powder coating material. The barrier filters 42 used in commercial practice are disposed in the first Y-block 40. Each pinch valve may have an associated barrier element 42 for embodiments wherein each pinch valve is individually controlled. The manifold 14 provides the timing and supply for pressure applied to the pinch valve pressure chambers 43.

Also, in order to provide a continuous powder flow output from the pump 12, the pump 12 may optionally include two pump chambers 28, 28' (we use a prime ' to indicate like parts for a two chamber pump) each having its own pair of control valves 20/20', 24/24'. Thus, a typical dense phase pump may have two gas permeable filters 30, 30' and four control valves 20/20', 24/24' and four barrier filters 42, 42'. The first Y-block 40 may be provided with four powder flow branches 44/44' and 46/46'. The use of the second pump chamber 28' also results in use of a second Y-block 48 because as the first pump chamber 28 is pulling powder from the supply 16, the second pump chamber 28' is pushing powder out to the spray gun 18 and vice-versa. Therefore, the second Y-block 48 is disposed to provide powder flow branches 50, 50' and 52/52' between the supply 16, the spray gun 18 and the control valves 20/20', 24/24'. In the 878 patent, the control valves 20/20', 24/24' are positioned in a valve body 54, which may be transparent to allow observation of the operation of the control valves, as well as to detect a ruptured pinch valve. When a pinch valve ruptures, powder escapes into the pinch valve housing 72 and this will indicate to an operator to change out the pinch valve or the pinch valve housing 72 with new pinch valves.

Powder coating systems frequently use many different types and color of powder coating material, and when the type or color of the powder coating material is changed, the pump 12 must be cleaned. Part of the cleaning operation is to purge the pump chambers 28, 28' as well as other portions of the powder flow paths. One of the purging options described in the 878 patent is to apply a purge gas 56 into an open or purge end 30*b*/30*b*' of the gas permeable filters 30, 30' that is opposite the single inlet/outlet end 30*a*/30*a*' of the gas permeable filters 30, 30'. Control of the purge timing and pressure source is carried out in the manifold 14.

The filter pressure chambers 32, 32' along with the gas permeable filters 30, 30' are disposed in a pump housing 58. In the embodiments shown in the 878 patent, the pump housing 58 interfaces with the manifold 14 in order to provide the various pressure signals needed to operate the control valves 20/20', 24/24' and the pump chambers 28, 28'. The purge lines 56 separately attach to the pump housing 58 from the top of the pump housing and in-line with the check valve flow path.

Further explanation of the design and operation of the dense phase pump 12 is provided in the 878 patent, but the foregoing description is sufficient to understand and practice the present inventions.

Figure 2:
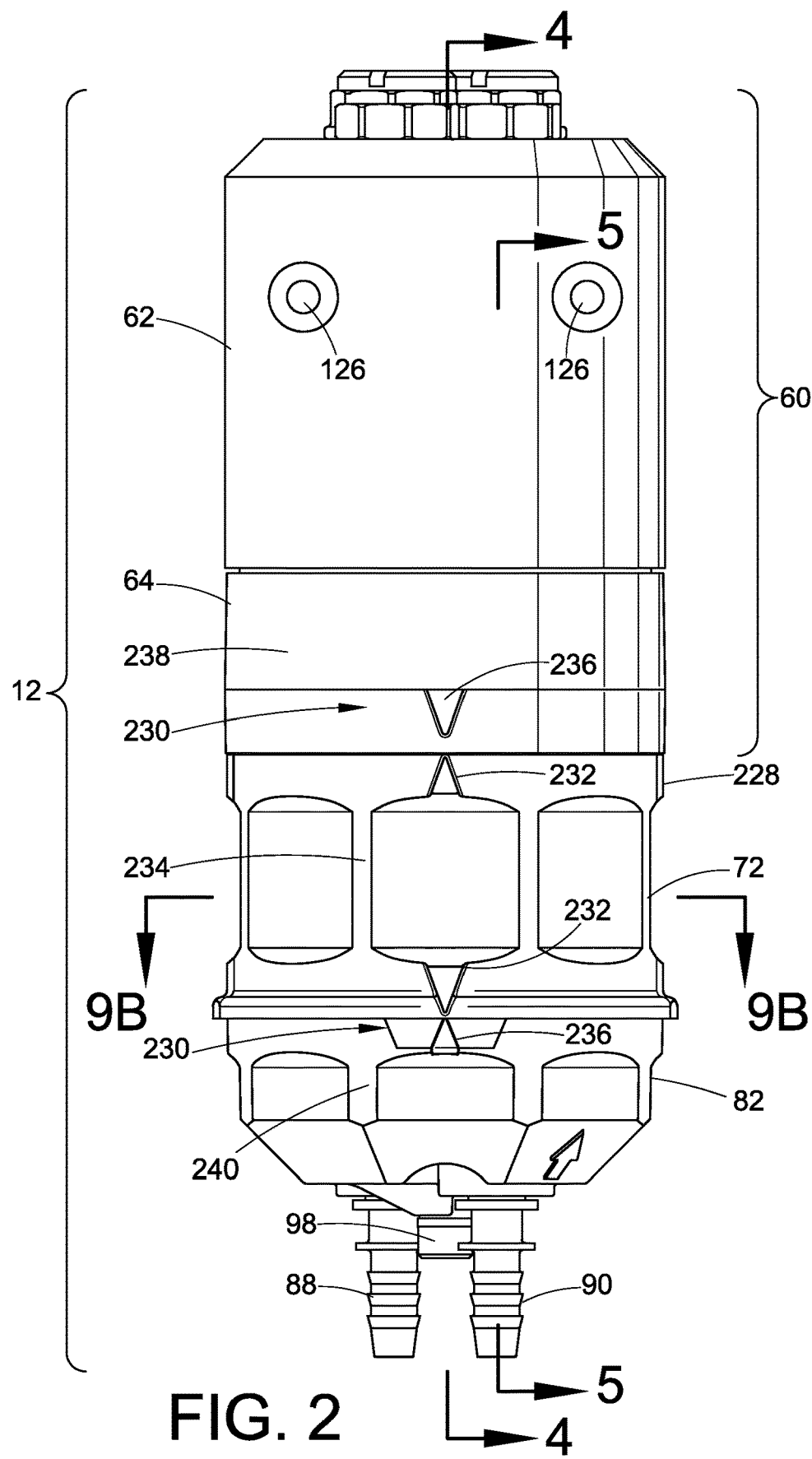
FIG. 2 is a front end elevation of the assembly of FIG. 1.
Figure 3:
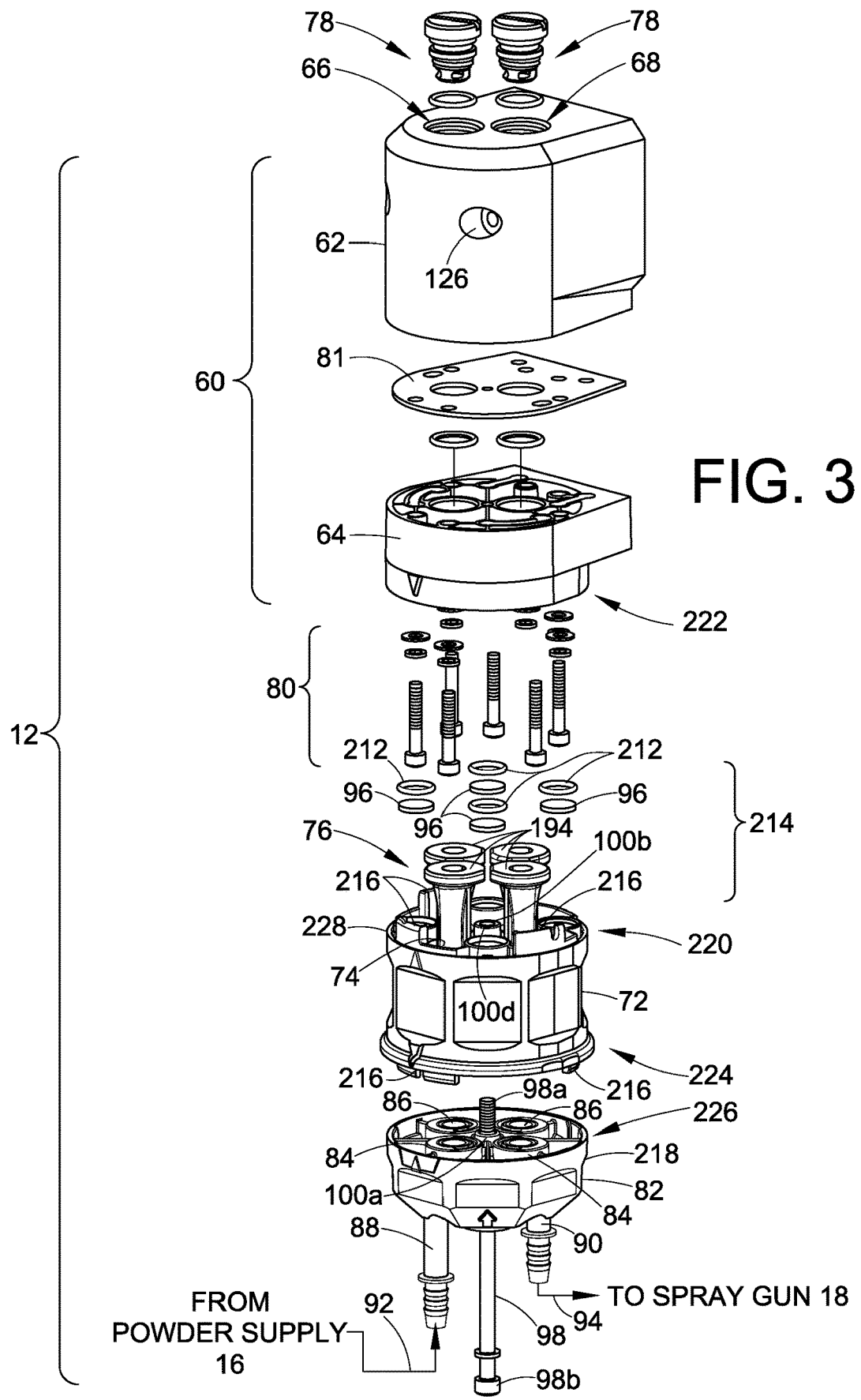
FIG. 3 is an exploded perspective of the assembly of FIG. 1.

Turning next to FIGS. 2 and 3, an embodiment of the dense phase delivery pump 12 in accordance with the present disclosure includes a first housing 60, which may include a pump body or housing 62 and a first or upper powder flow block or housing 64. The first housing 60 has a first pump chamber 66 and a second pump chamber 68 which each have respective gas permeable filters 70 associated therewith (see also FIG. 5). For the most part, the gas permeable filters 70 are disposed in the pump body 62 although a lower portion of each may extend into the first powder flow block 64. Alternatively the gas permeable filters 70 may be fully disposed in the pump body 62.

Figure 4:
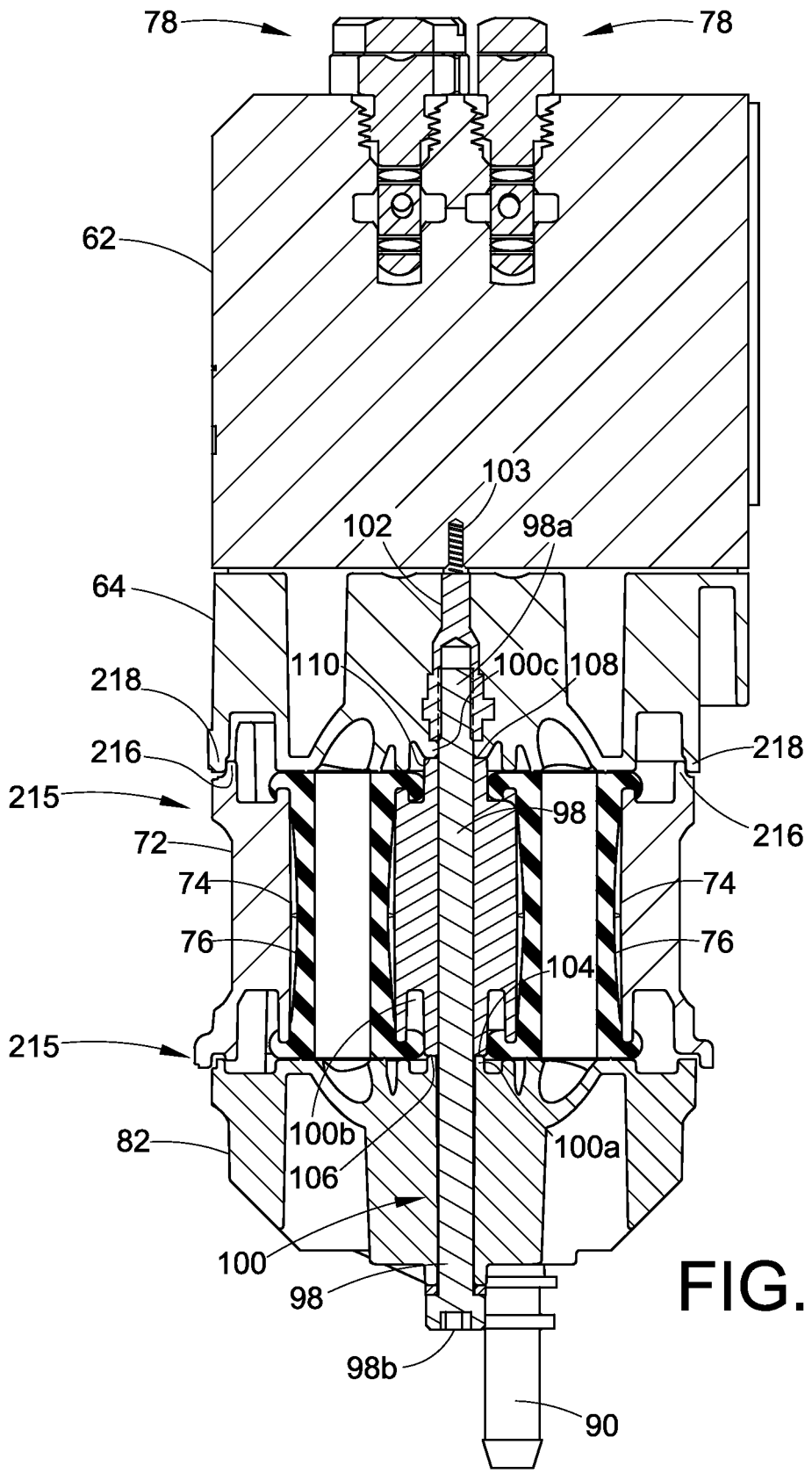
FIG. 4 is a side elevation of the assembly of FIG. 1, in longitudinal cross-section along the line 4-4 in FIG. 2.
Figure 5:
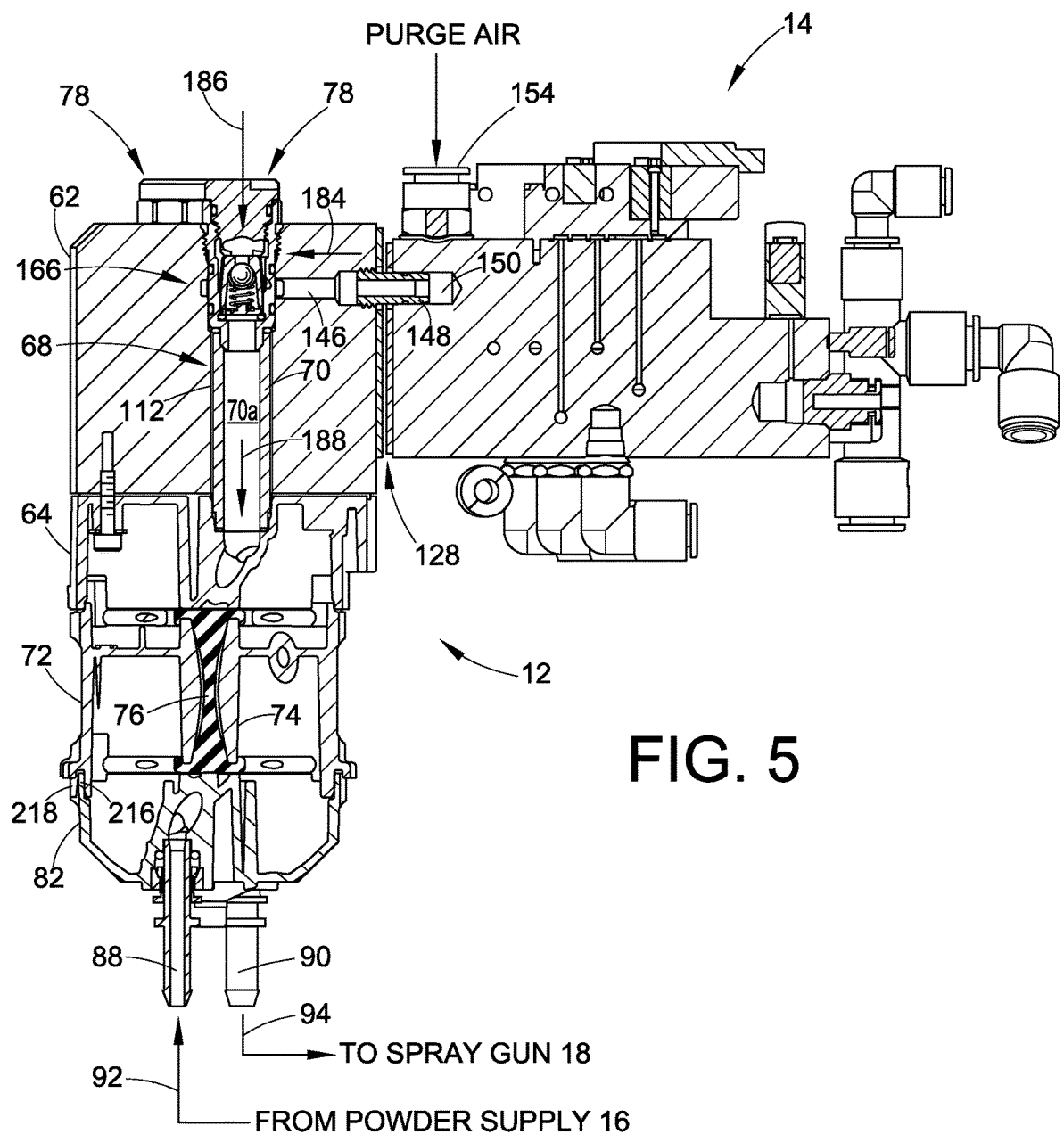
FIG. 5 is a side elevation of the assembly of FIG. 1, in longitudinal cross-section along the line 5-5 in FIG. 2.

With reference also to FIGS. 4 and 5, a pinch valve housing 72 preferably but not necessarily is a transparent unitary body that includes four pinch valve pressure chambers 74 (only two are shown in FIG. 4) that each receives a control valve 76. Note in FIG. 3 that the control valves 76 are shown partially installed in their respective pinch valve pressure chambers 74. Each control valve 76 may be realized in the form of an elastic flexible pinch valve made of a suitable material, for example, natural rubber.

The pump body 62 receives first and second check valve assemblies 78 which will be further described hereinbelow. The first powder flow block 64 may be attached to the bottom side of the pump body 62 with bolts 80, and includes powder flow branches that serve as inlet and outlet powder flow passages for the powder chambers 70*a*. A gasket 81 may also optionally be used to seal air passages between the pump body 62 and the first powder block 64.

Reference herein to top, bottom, upper and lower are for convenience when viewing the drawings, but do not require that the dense phase pump 12 be oriented in any particular alignment during use; although a vertical or upright orientation as depicted in the drawings is common.

As in the 878 patent, because the exemplary embodiment uses two pump chambers 66, 68, we also use a second or lower powder flow block or housing 82. The second flow block 82 provides powder flow branches 84, 86 (there are a total of four powder flow branches in the second powder flow block 82, two for each pump chamber 66, 68 for powder flow into and out of the pump chambers) respectively to a pump inlet connection 88 and a pump outlet connection 90. The pump inlet connection 88 is connectable to a powder supply 16 through a supply hose 92 and the pump outlet connection 90 is connectable to a spray gun 18 by a gun hose 94.

With reference to FIGS. 2 and 4, we illustrate another embodiment of the first concept discussed above. First, it should be noted that the pinch valves 76 may be thought of as a wear item, meaning that due to the repetitive flexing of the pinch valve, the pinch valves 76 tend over time to weaken or wear out or rupture and need replacing. Also, we have moved the barrier filters 96 to be disposed in the pinch valve housing 72 rather than in the upper Y-block (40) as done in prior designs. The barrier filters 96 are also wear items because the barrier filters 96 tend over time to become blocked or blinded with powder or at least to have reduced porosity. By disposing the barrier filters 96 in the pinch valve housing 72 with the pinch valves 76, easier access is provided for replacing the barrier filters 96. The pinch valves 76 and the barrier filters 96 are referred to herein as example of replaceable components (214, FIG. 3) because they tend to wear out over time and can be serviced so that the overall pump can continue in use. Other pump designs may use additional or different replaceable components.

In order to simplify service access to the replaceable components (214) in the pinch valve housing 72, which reduces repair, maintenance and down time of the dense phase pump 12, a single releasable fastener 98 is used to attach the second powder flow block 82 and the pinch valve housing 72 to the pump housing 60. In an embodiment, for example, FIG. 3 herein, the second powder flow block 82 and the pinch valve housing 72 may be attached to the first powder flow block 64 using the single releasable fastener 98. In this manner, by simply loosening or releasing the single releasable fastener 98, the pinch valve housing 72 can be removed from the pump housing 60 for access to the replaceable components 76, 96 (214). The replaceable components (214) can be replaced individually as needed. Alternatively, the entire pinch valve housing 72 with replacement components as a discrete assembly can be installed in place of the previously installed pinch valve housing 72. Reassembly is also simplified by using the single releasable fastener 98.

In one embodiment, the single releasable fastener 98 may be realized in the form of an end threaded bolt, however, many other types of releasable fasteners may alternatively be used. We use the term releasable to indicate that the single fastener 98 is used for assembly and disassembly of the pinch valve housing 72 as can occur for normal routine maintenance and repair. For access to the replaceable components (214), and/or for removal and replacement of the discrete assembly of the pinch valve housing 72 and the replaceable components (214), we refer herein to releasing or loosening the single releasable fastener 98 because complete removal of the fastener may not be necessary for all repair or maintenance activities. But if needed, the single releasable fastener 98 can be completely withdrawn. It is important to note that the single releasable fastener concept may be used in dense phase pumps other than the exemplary embodiment herein, for example, with the dense phase pump described in the 878 patent or others known or later developed.

Figure 4A:
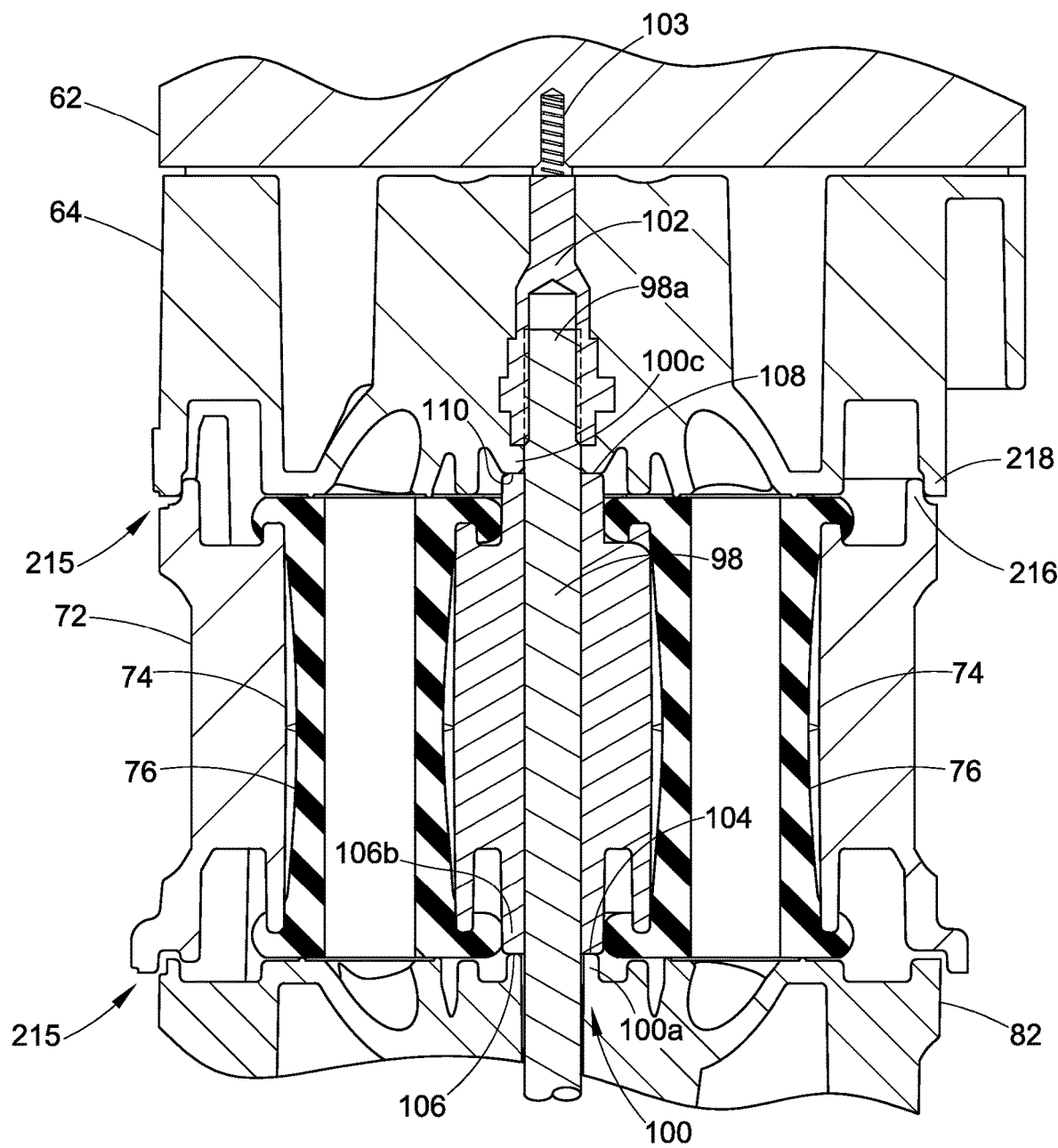
FIG. 4A is an enlarged view of a portion of FIG. 4.

With reference to FIGS. 3, 4 and 4A, the single releasable fastener 98 extends through a central bore 100d of a multi-section column 100. Preferably but not necessarily the column 100 is centrally located with respect to the pinch valve 76 locations, for example, along a central longitudinal axis X of the dense phase pump 12. The pinch valves 76, for example, may be uniformly spaced about the central longitudinal axis of the pinch valve housing 72. For an exemplary embodiment of the pinch valve housing 72, the pinch valves 76 may be disposed approximately ninety degrees apart from each other. The central location of the column 100 then facilitates an even distribution of compressive forces as the fastener 98 is tightened. A first column section 100a is centrally positioned in the second powder flow block 82; a second column section 100b extends centrally through the pinch valve housing 72, and a third column section 100c is centrally positioned in the first powder flow block 64 (see also FIGS. 11 and 11A). The column 100 therefore may be realized with sections 100a-100c with each column section comprising a single central opening in the associated body that the single releasable fastener 98 extends through or into. For example, the pinch valve housing 72 includes the central column section 100b that extends all the way through the pinch valve housing 72 and provides a single central opening for the single releasable fastener.

The column 100 may be integrally formed as part of the second powder flow block 82 (column section 100a), the pinch valve housing 72 (column section 100b), and the first powder flow block 64 (column section 100c). The three sections 100a-100c all align axially with each other so that the single releasable fastener 98 extends through the central bore 100d and into all three sections 100a-100c and may have a threaded end 98a that can be screwed into a threaded insert 102 in the first powder flow block 64. As the fastener 98 is tightened into the threaded insert 102, the fastener 98 is under tension and pulls together an upper side (226) of the second powder flow block 82 against a bottom or facing side (224) of the pinch valve housing 72, and an upper side (220) of the pinch valve housing 72 against the bottom or facing side (222) of the first powder flow block 64 and holds these three pieces 82, 72 and 64 in axial compression (also see FIG. 3). The threaded insert 102 may comprise metal such as brass for example, and may contact a metal spring 103 in order to provide electrical ground for the fastener 98.

The pinch valves 76 each include two end flanges (194) that will be further described below. These end flanges are axially compressed when the single releasable fastener 98 is tightened to form tight seals so that powder coating material flowing through the pinch valves 76 does not by-pass around the pinch valves and escape into or out of the pinch valve body 72. It is useful then that the single releasable fastener 98 be sufficiently robust and tightened so that the pinch valves 76 are adequately compressed to seal. The single releasable fastener 98 may include a socket 98b that accepts an Allen wrench to allow sufficient torque to be applied to the fastener 98.

It is also useful that the single releasable fastener 98 not be over-tightened with too much torque as this could crush and damage the pinch valve 76 end flanges (194). The multi-section column 100 functions as a stop mechanism to prevent over-torque being applied to the single releasable fastener 98. The first column section 100a has an upper distal end 104 that contacts a lower distal end 106 of the second column section 100b; and the second column section 100b has an upper distal end 108 that contacts a lower distal end 110 of the third column section 100c. The distal ends 104, 106, 108, 110 make contact so as to form the continuous central bore 100d within a continuous supporting column 100. In particular, the distal ends 104, 106, 108 and 110 make full contact at a predetermined or controlled compression of the pinch valves 76. Once all three column sections 100a-c are in full contact, additional axial movement or compression of the three bodies 82, 72 and 64 is prevented and the pinch valves 76 cannot be further compressed or over-compressed. Thus, the facing contacting surface pairs, namely the distal ends 104/106 between the upper side (220) of the pinch valve housing 72 and the lower side (222) of the first powder flow block 64, and the distal ends 108/110 between the lower side (224) of the pinch valve housing 72 and the upper side (226) of the second powder flow block 82, function as positive stops to prevent over-tightening or over-torque of the single releasable fastener 98 which could otherwise over compress or damage the pinch valve end flanges (194).

Figure 6:
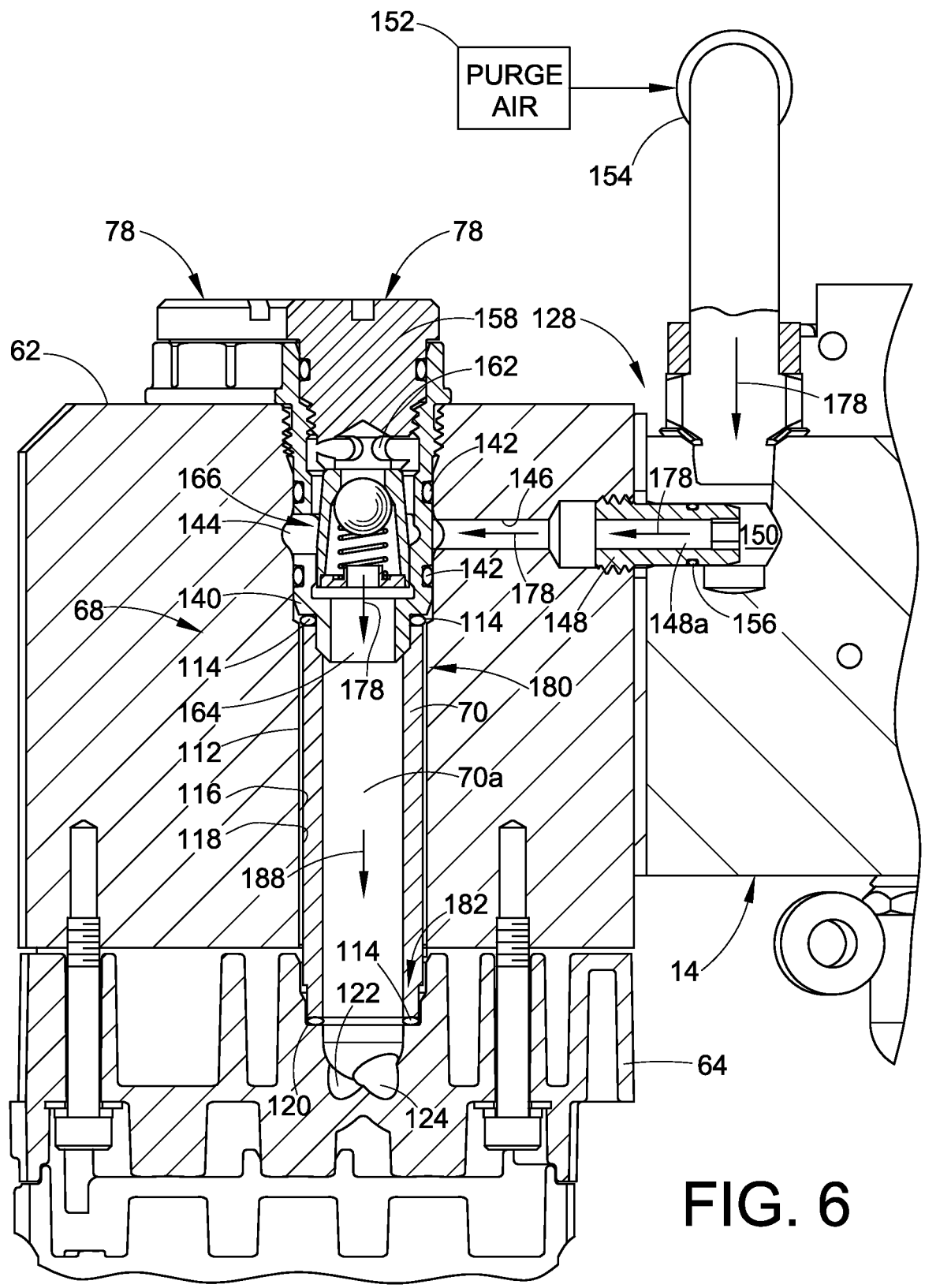
FIG. 6 is an enlarged side elevation of an interface between the pump body and the manifold of FIG. 1, in longitudinal cross-section.
Figure 7:
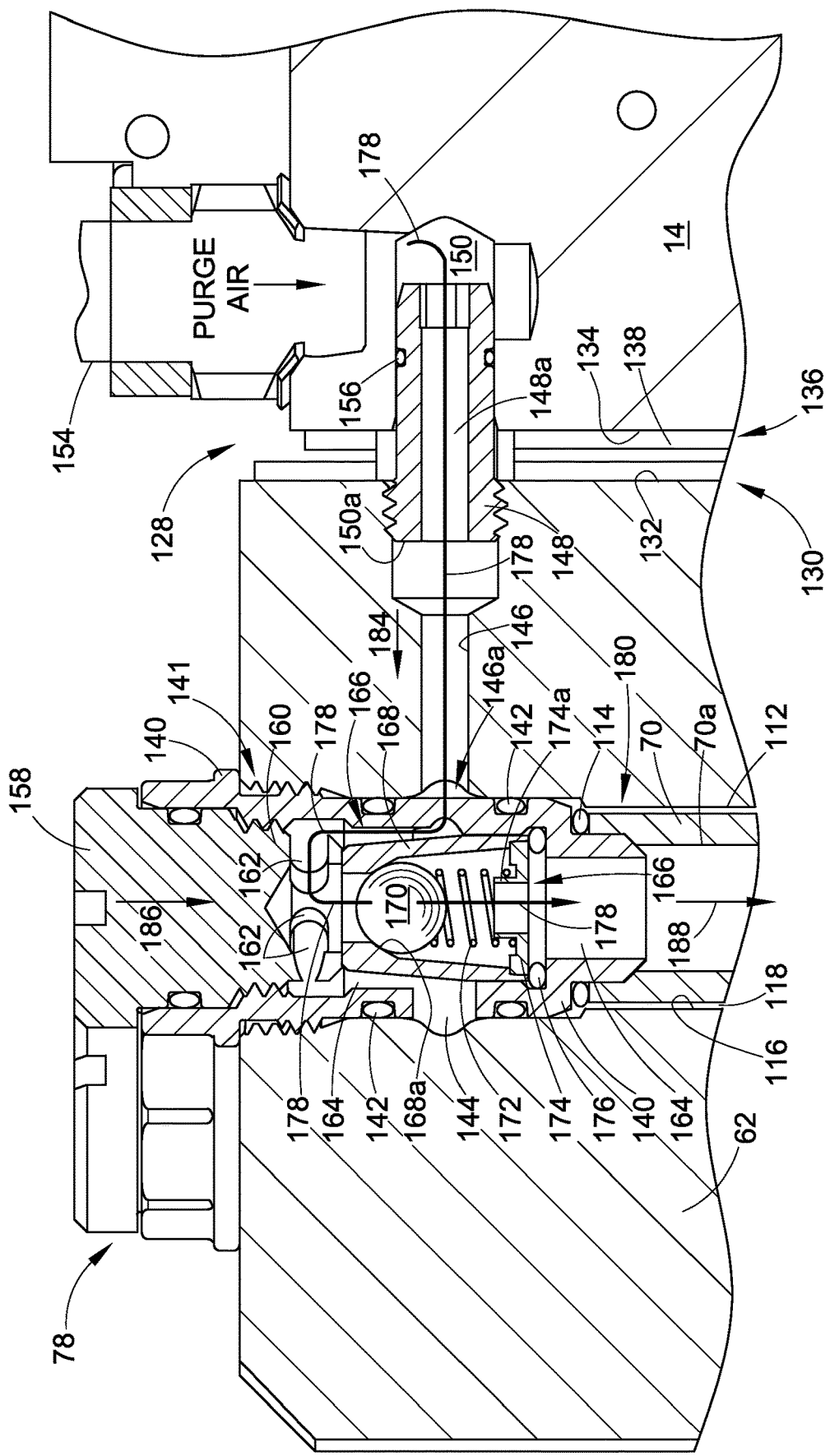
FIG. 7 is an enlarged view of a check valve assembly in FIG. 6, in longitudinal cross-section.

With reference to FIGS. 5, 6 and 7, as noted above the manifold 14 provides purge air to the dense phase pump 12. One of the purge modes that can be used is to direct a flow of pressurized air longitudinally through each gas permeable filter 70. We use the term longitudinally in this context to indicate the purge air flow path from an open purge end 30b to an open inlet/outlet end 30a of the gas permeable filter 70 (see FIG. 1A). Since both pump chambers 66, 68 are the same, we describe only one of the purge arrangements for one of the two gas permeable filters 70, it being recognized that the other pump chamber can similarly use the same structure and purging method as needed.

The dense phase pump 12 includes the pair of pump chambers 66, 68 (only the pump chamber 68 is visible in FIGS. 5-7). The pump chamber 68 includes a bore 112 that extends through the pump body 62. Disposed within the bore 112 is the check valve assembly 78 and a gas permeable filter 70. Seals 114, such as o-rings for example, provide pressure tight seals at either end of the gas permeable filter 70 so that a portion of the bore 112 serves as the pressure chamber 32 (FIG. 1A) volume with a portion of the bore 112 wall providing a pressure chamber wall 116 about the gas permeable filter 70 disposed therein. The gas permeable filter 70 may be a hollow cylinder comprising a gas porous material such as, for example, porous polyethylene. This same material may also be used for the barrier filter discs 96. The central volume 70a of the hollow cylinder thus serves as a powder chamber by which powder is drawn into and pushed out of the dense phase pump 12. The gas permeable filter 70 fits within the pressure chamber wall 116 so as to provide an annulus 118 that serves as a pressure chamber for the gas permeable filter 70. The annulus 118 is in fluid communication (not shown in FIG. 5) with sources of the positive pressure 38 ($P^+$) and negative pressure 36 ($P^-$) (FIG. 1A) as described above and in the 878 patent so that powder coating material is drawn into the powder chamber 70a under negative pressure and pushed out of the powder chamber 70a under positive pressure. The lower end of the gas permeable filter 70 may be received in a counterbore 120 that may be in the first powder flow block 64, and aligned so that the powder chamber 70a is in fluid communication with an inlet powder flow branch 122 and an outlet powder flow branch 124 which in turn are in fluid communication with associated pinch valves 76. By having a portion of each gas permeable filter 70 extend out of the pump body 62, the filters 70 are easily accessed for installation and removal when the bolts 80 (FIG. 3) are not holding the pump body 62 and the first powder flow block 64 together.

The pump body 62 is attached to the manifold 14 by bolts 126 (FIGS. 1 and 2). As noted above, the manifold 14 in part is an air manifold that provides various pressure signals and conditions to the dense phase pump 12, including pressure for the pump chambers 66, 68, purge air 56 (FIG. 1A), and pressure for the pinch valves 76. Therefore, we provide a sealed interface 128 between the pump body 62 and the manifold 14 for air passages (not shown) to pass therebetween. A back side 130 of the pump body 62 presents a first planar surface 132 that faces a second planar surface 134 that is presented by a front side 136 of the manifold 14. The sealed interface 128 is compressed between the two facing planar surfaces 132, 134 when the bolts 126 are tightened down. The sealed interface 128 may be realized, for example, with a gasket 138.

With particular reference to FIG. 7, the check valve assembly 78 includes a check valve body 140 that may be threadably installed in a threaded portion of the bore 112 wall. Seals 142 such as o-rings provide a sealed chamber 144 that is provided in the pump body 62 about a portion of the check valve body 140. A purge inlet bore 146 is provided in the pump body 62. A coupler 148 having an air passage 148a therethrough is installed in one end of the purge inlet bore 146 and inserts into a purge outlet bore 150 in the manifold 14. The purge outlet bore 150 receives purge air from a purge air source 152 through an air fitting 154 in the manifold 14. Timing and control of the purge air is provided by valves and controls in the manifold 14. The coupler 148 bridges the interface 128 between the pump body 62 and the manifold 14 to provide a pressure tight sealed air passage 148a for purge air from the manifold 14 into the pump body 62. A seal 156 such as an o-ring, for example, may be used to seal the coupler 148 in the manifold purge outlet bore 150.

The purge inlet bore 146 opens to the sealed chamber 144 and therefore provides a purge air inlet 146a to the check valve assembly 78 via the sealed chamber 144. The manifold purge outlet bore 150 provides a purge air outlet 150a from the manifold 14 that is in fluid communication with the purge air inlet 146a to the check valve assembly 78.

A check valve plug 158 may be threadably attached to the check valve body 140 and includes a hollow cylindrical extension 160. The cylindrical extension 160 is provided with one or more through ports or holes 162 that establish fluid communication between the sealed chamber 144 and an interior cavity 164 of the check valve body 144. Disposed within the check valve cavity 164 is a ball type check valve 166. The interior cavity 164 of the check valve body 144 is in fluid communication with the powder chamber 70a only when the check valve is open. The check valve 166 includes a sleeve-like valve seat member 168 that provides a valve seat 168a; a valve member 170, for example a ball; and a biasing element 172, for example, a spring. The spring 172 is disposed between the valve member 170 and the valve seat 168 in a compressed condition so as to urge the ball 170 into sealing engagement with the valve seat 168a. The check valve 166 is therefore in a normally closed condition with the ball 170 urged against the valve seat 168a in the absence of purge air pressure.

When purge air is supplied to the check valve 166, the check valve remains closed until the purge air pressure exceeds the cracking or opening pressure of the check valve 166. The opening pressure of the check valve 166 can be controlled by appropriate selection of the strength of the biasing element 172. When the purge air pressure exceeds the opening pressure of the check valve 166, the valve member 170 moves away from the valve seat 168a and purge air flows through the check valve 166 and into the powder chamber 70a to purge powder therefrom.

The valve seat cage 168 may optionally include a second valve seat member 174 that presents a second valve seat 174a on the downstream end of the valve seat cage. This valve seat may be used to cutoff purge flow in the event of an overpressure condition in the purge supply. The second valve seat 174 may be sealed in the check valve body 140 by a seal 176 such as an o-ring, for example.

The flow path of purge air when the check valve 166 is open is represented schematically by the arrow 178 (see FIGS. 6 and 7). The purge air 178 enters the pump body 62 from the coupler 148 that is in fluid communication with the purge air supply 152. The purge air 178 flows into the sealed chamber 144 and because the chamber is sealed, the purge air is forced up towards and through the holes 162. When the purge air pressure exceeds the opening pressure of the check valve 166, the ball 170 unseats from the valve seat 168a and purge air 178 flows along the flow axis of the check valve 166 and passes into and through the powder chamber 70a. From FIG. 1A it will be noted that with the proper valves open during purge, the purge air can pass all the way through to the spray gun 18 and purge the spray gun at the same time, as well as purge the powder paths all the way back to the powder supply 16 if so needed. Note that the purge air 178 enters the gas permeable filter 70 at the open purge end 180 (corresponding to 30b in FIG. 1A) thereof that is opposite the open end 182 (corresponding to 30a in FIG. 1A) that serves as both the inlet and outlet of the pump chamber 68 for powder flow.

In prior designs such as the 878 patent, purge air enters the gas permeable filter 70 through the same open end 30*b* of the gas permeable filter 30 but is supplied through an air hose and connector that are mounted on top of the check valve assembly meaning that, in the 878 patent, the purge air is supplied to the check valve in-line or coaxial with the flow axis 186 of the check valve and the longitudinal axis 188 of the gas permeable filter 30. But we have found that when many dense phase pumps are being used in a powder coating system, there is a large number of purge air hoses which makes the system cluttered, less manageable and less aesthetically appealing.

As shown in FIG. 7, the purge air 178 enters the purge air inlet 146*a* of the check valve assembly 68 off-axis from the longitudinal axis 188 of powder flow through the gas permeable filter 70, which is optionally in-line or coaxial with the flow axis 186 of the check valve 166. The illustrated embodiment shows that the purge air 178 enters the pump body 62 along a purge flow directional inlet axis 184 that is transverse the directional flow axis 186 of the check valve 166. The check valve directional flow axis 186 may be but need not be in-line with the longitudinal axis 188 of the gas permeable filter 70 and the powder chamber 70*a*.

The purge air 178 enters the pump body 62 and flows into the check valve assembly 68 along a purge flow inlet axis 184 that is transverse the longitudinal axis 188 of the gas permeable filter 70. The purge air 178 then flows along a flow path that forces the purge air to change direction by ninety degrees as it enters the check valve 166 so that the purge air flow is in-line with the check valve flow axis 186 and thus also in-line with the longitudinal axis 188 of the gas permeable filter 70 and the powder chamber 70*a*.

A benefit of the transverse inlet flow of the purge air is that it facilitates supplying the purge air from a side mounted arrangement between the pump body 62 and the manifold 14. This completely eliminates the need for top mounted purge hoses connected between the check valve assembly 68 and the manifold 14. The off-axis angle of the inlet purge air flow, which is defined as being the angle between the purge flow inlet axis 184 and the longitudinal axis 188 of the gas permeable filter 70 and the powder chamber 70*a*, is not critical. We use a basically perpendicular inlet flow (ninety degrees off-axis angle of the purge air inlet axis 184 relative to the longitudinal axis 188 of the powder chamber 70*a*) because such passages can in some cases be easier to machine. But the choice of off-axis angle for a transverse purge flow inlet may be selected as needed for a particular dense phase pump 12 and/or manifold 14. It should be noted that the benefit of the transverse entry of the purge air follows from the transverse relationship of the purge flow inlet axis and the longitudinal flow axis through the gas permeable filter 70, meaning that the check valve 166 may be oriented other than in-line with the gas permeable filter longitudinal axis 188 if so needed for a particular application. In such an alternative embodiment (not shown), it may be preferred that the check valve 166 orientation still provide an outlet flow of the purge air that is in-line with the gas permeable filter 70 longitudinal axis. As an example, the ninety degree turn of the purge air flow path could occur within the check valve 166 itself.

Turning next to FIGS. 8A-8B, a pinch valve 76 is illustrated. The pinch valve 76 includes a pinch valve body 190 with a central passage 192 therethrough along a longitudinal axis X. The pinch valve 76 further includes first and second end flanges 194 that may be the same size and shape. By having the end flanges 194 be the same, it does not matter whether the pinch valve 76 is installed in a first longitudinal orientation into the pinch valve housing 72, or is flipped around and installed in the inverse longitudinal orientation.

In some pinch valves, we provide a central passage 192 that is not circular in cross-section but rather has a cats-eye shape (as shown in FIG. 8B) The pinch valve 76 may further have a pair of diametrically opposed and longitudinally extending ribs 196 along opposite sides of the valve body 190. These ribs 196 provide a localized stiffness to the pinch valve body 190 so that when the pinch valve is exposed to external positive pressure, the portions 198 of the pinch valve body between the ribs 196 act as hinge points to allow the pinch valve to close without high stresses on the valve body 190. In particular, the pinch valve 76 is closed off by having the major sides 192*a* of the cats-eye passage 192 being compressed together under force of pneumatic pressure, with the ribs 196 reducing stress on the valve body. When the pinch valve 76 is closed, the elastic ribs 196 are in tension so that when the pressure is released or vented, the ribs 196 assist in returning the pinch valve 76 to an open position. Note from FIG. 8B that the pinch valve body 192 shape includes generally elliptical portions when viewed in transverse cross-section. This shape allows the pinch valve to open and close by the outer ends of the ellipses to act as hinge points when the pinch valve is closed.

The end flanges 194 may each include a peripheral shape or profile when viewed in plan (FIG. 9) that assists in assembly of the pinch valve 76 into the pinch valve pressure chamber 74 in the pinch valve housing 72. For example, the ribs 196 preferably fit inside corresponding longitudinal slots 200 provided in the pinch valve pressure chamber 74 (note that in FIG. 8B the slots 200 and the pressure chamber 74 are illustrated in schematic fashion). In order to make it easier to align the ribs 196 with the slots 200, we provide two flats 202 or other recognizable peripheral shape of the end flanges 194 to indicate the preferred orientation. The end flanges 194 each then has a non-circular peripheral shape.

Figure 9:
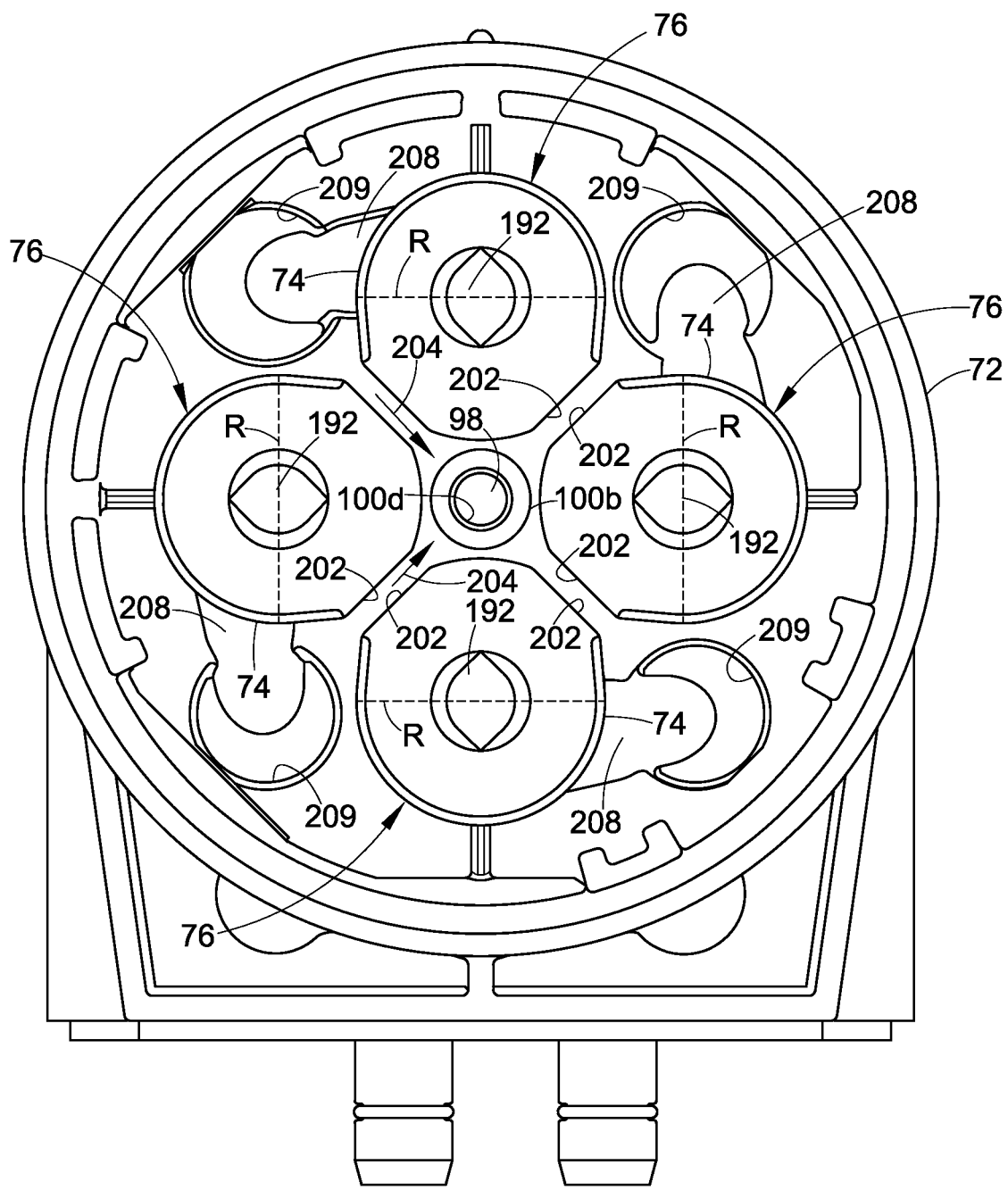
FIG. 9 is a top plan view of a pinch valve housing and replaceable components installed therein.

FIG. 9 shows all four pinch valve 76 installed in the pinch valve housing 72. Note that the flats 202 form a visual appearance as an arrow head or pointer to an assembler (as represented by the arrows 204 in FIG. 9) that points to the center of the pinch valve body 72, for example the center column 100. This helps the assembler locate the ribs 196 into the corresponding slots 200 in the pinch valve pressure chamber 74. The flats 202 therefore act as alignment indicia in assisting the assembler to install the pinch valve in a proper orientation. The flats 202 may be provided optionally in only the upper surface portions of the associated end flanges 194 so that the end flanges 194 have radially symmetric seal surfaces 206 (also see FIG. 10) within the pinch valve housing 72. The dashed lines R in FIG. 9 show the alignment of the ribs 196 and the slots 200 which are not otherwise visible in the drawing.

Figure 10:
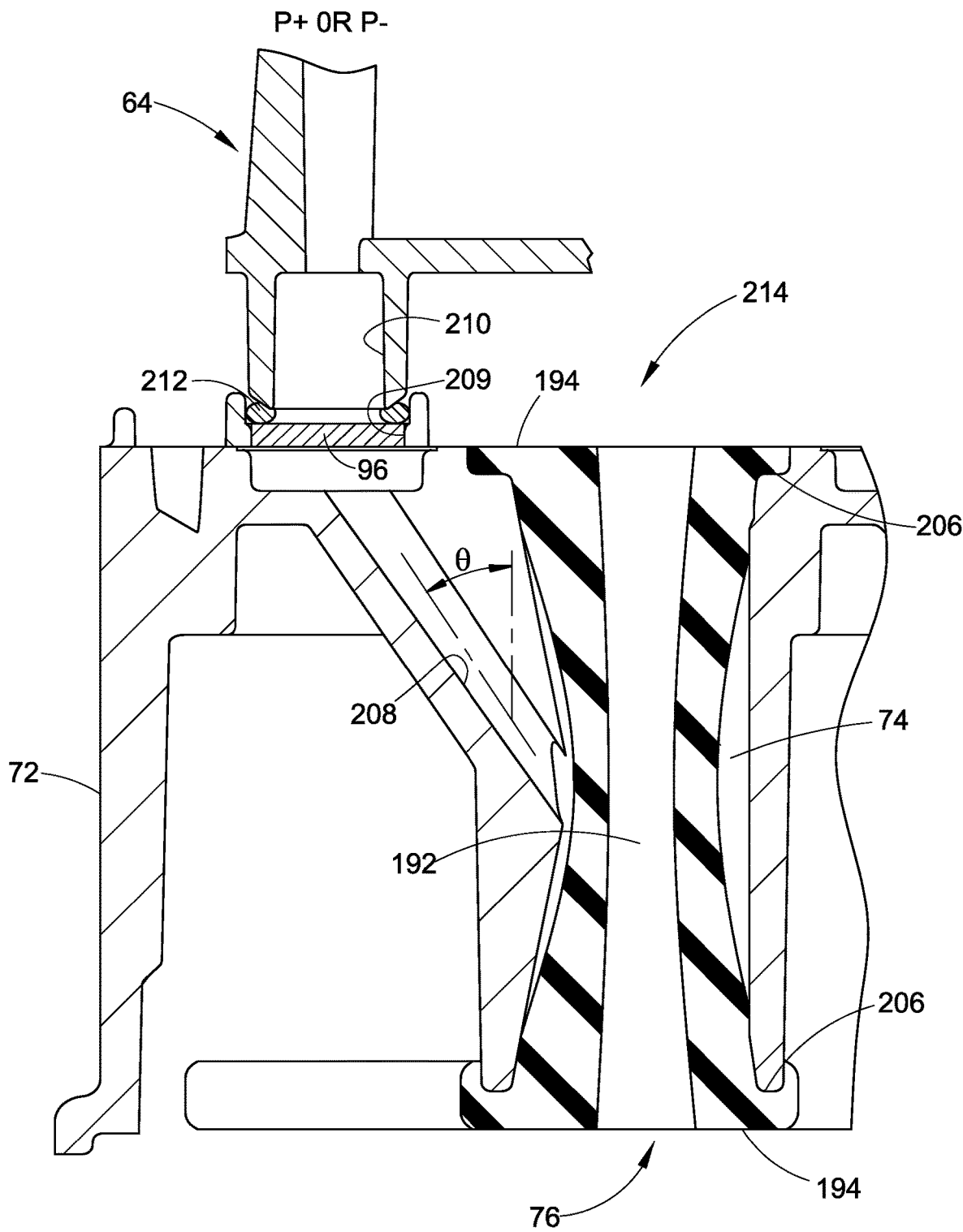
FIG. 10 is cross-sectional illustration of a set of replaceable components in an installed condition in a pinch valve housing.

With reference to FIG. 10, each pinch valve 76 is disposed in a pinch valve pressure chamber or bore 74 (corresponding to 43 in FIG. 1A) in the pinch valve housing 72. The pinch valve pressure chamber 74 generally conforms to the elliptical shape of the pinch valve body 190. The pinch valve end flanges 194 are sealingly compressed when the pinch valve housing 72 is assembled between the first powder flow block 64 and the second powder flow block 82. The pinch valve pressure chamber 74 receives pressure via a pneumatic pressure passage 208, depending on whether the pinch valve 76 is to be in an open or closed position. The pinch valve pressure chamber 74 shares the same longitudinal axis X as the pinch valve 76 disposed therein.

In the 878 patent, the pressure passages that open to the pinch valve pressure chamber are formed at ninety degrees from the longitudinal axis of the pinch valve pressure chamber. In other words, the air pressure from the manifold enters the pinch valve housing from the top end and then a pressure passage is first drilled down into the pinch valve body and then cross-drilled for access to the pinch valve pressure chamber. In the present disclosure and exemplary embodiments, and as illustrated in FIG. 10, the pressure passage 208 may be formed at an oblique angle relative to the longitudinal axis of the pinch valve pressure chamber 74. For example, the pressure passage 208 has an oblique entry angle θ to the pinch valve pressure chamber 74. The obliquely angled pressure passage 208 may extend, for example, from an inlet port 209 to the pinch valve pressure chamber 74. The oblique angle θ may in some cases be easier to form in the pinch valve housing 72, and also may provide a more effective entry for the air pressure in to the pressure chamber 74.

In order to protect the pneumatic sources from powder infiltration in the event of a pinch valve failure, a respective barrier element 96, for example a barrier filter in the form of a flat disc 96, is disposed in a port 209 that is provided in the upper side 220 of the pinch valve housing 72. The port 209 is in fluid communication with the pneumatic flow passage 208. Pneumatic pressure is provided through an associated pneumatic branch 210 in the first powder flow block 64. The first powder flow block 64, in addition to providing the powder flow branches between the pinch valves 76 and the gas permeable filters 70, also provides the pneumatic branches for positive pressure from the manifold 14 to the pinch valve pressure chambers 74 in the pinch valve housing 72. However, in contrast to prior designs where the barrier elements were disposed in the upper Y-block, the barrier elements 96 in this disclosure may be disposed in the pinch valve housing 72 so that they are accessible and easily replaceable when the single releasable fastener 98 is loosened. A suitable seal 212, such as an o-ring for example, may be used to provide a pressure tight seal between the pneumatic branch 210 of the first powder flow block 64 and the pneumatic pressure passage 208 in the pinch valve housing 72. The pinch valves 76 and the barrier filter discs 96, as well as the seals 212 are therefore examples of replaceable components 214 (FIG. 3) that are readily accessible when the pinch valve housing 72 is separated from the first powder flow block 64. The replaceable components 214 typically will be wear items that over time and repeated operation of the dense phase pump 12 need to be replaced either as a repair action or during routine maintenance.

Figure 9A:
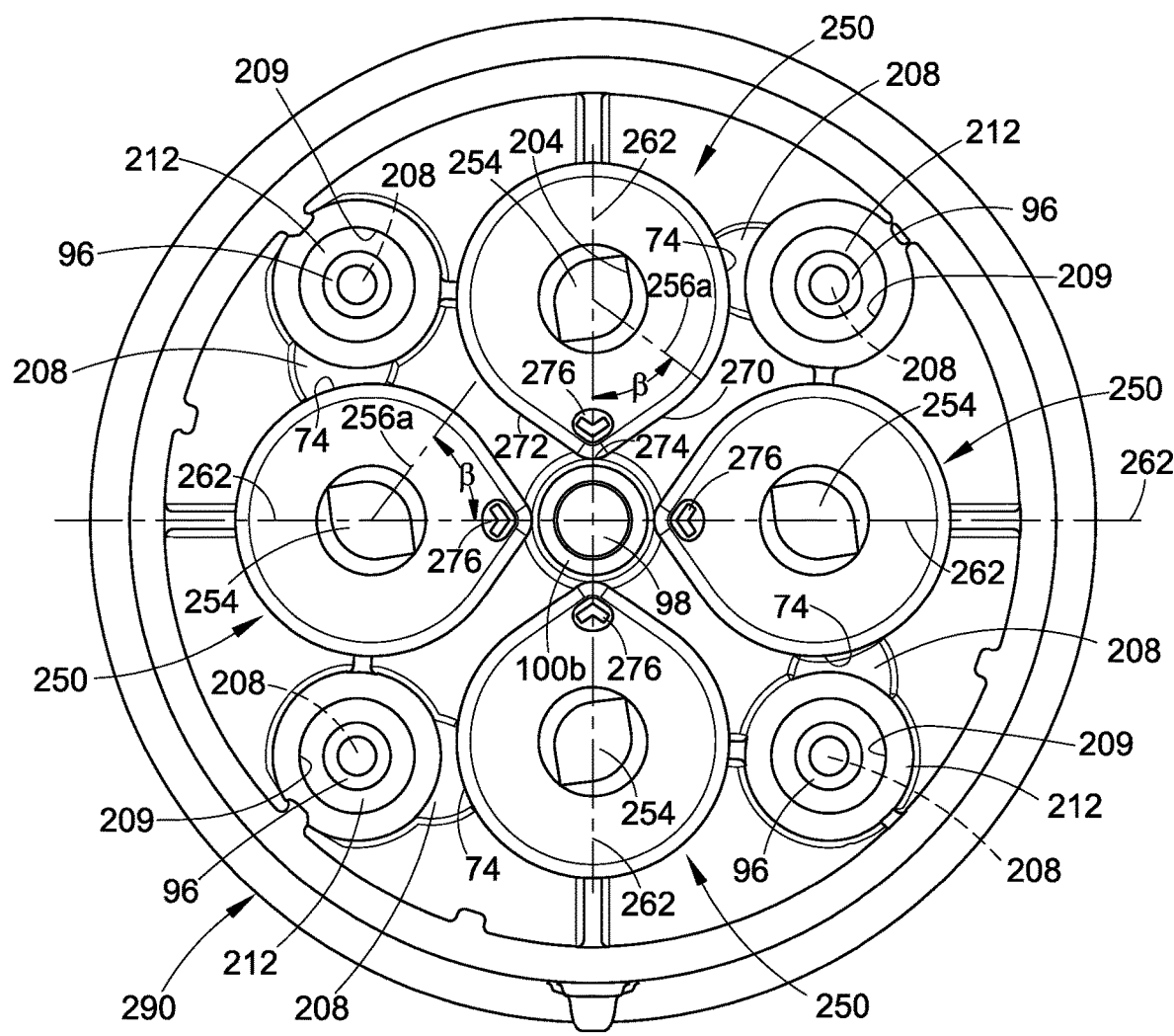
FIGS. 9A and 9B illustrate in plan and lateral cross-section another embodiment of a pinch valve housing and pinch valves installed therein, (FIG. 9B being taken along the line 9B-9B in FIG. 2)

With reference to FIGS. 8C and 8D and 9A, we show another embodiment of a pinch valve 250. The pinch valve 250 includes a generally cylindrical body 252 with a central passage 254 therethrough. As in the embodiment of FIGS. 8A and 8B, the central passage 254 may have but need not have a non-circular cross-section shape, for example the shape may be like a cats-eye shape, and the pinch valve body may have an elliptical shape in lateral cross-section. The pinch valve 250 may also include diametrically opposed ribs 256 and drawing lines 256a on the end flange surfaces (278) are shown to indicate the rib 256 diametric and directional orientation.

A first difference between the pinch valve 250 and the pinch valve 76 is that the upper end flange 258 and the lower end flange 260 are radially offset from one another. As will be additionally explained below, this radial offset is provided to accommodate the location of the slots in the pinch valve pressure chamber that receive the ribs 256. For reference, the drawings show a first alignment axis 262 for the upper end flange 258 and a second alignment axis 264 for the lower end flange 260 (best understood from FIG. 8D). The pinch valve 250 may still be reversible in the sense that it may be installed in the orientation of FIG. 8C or flipped around with the lower end flange 260. The alignment axes 262, 264 are referenced to an outermost radial extent of the respective end flanges 258, 260. It will be noted that the end flanges 194 of FIGS. 8A and 8B are non-circular, in contrast to the pinch valves of the 878 patent for example. The end flanges 258, 260 are also non-circular but have a more defined pointing profile as best viewed in FIG. 8D. Although the end flanges 258, 260 are radially offset from each other, they may otherwise be the same or matching shape so that the pinch valve 250 can be installed in a first longitudinal orientation or flipped around and installed in an inverse longitudinal orientation.

For the pinch valve 250, more than half of the circumferential portion 266, 268 of each end flange 258, 260 may still be circular, but two straight portions 270, 272 blend to a more defined point or pointer apex 274 that delimits a radially outermost radial extent of each end flange 258, 260. When viewed in plan, each end flange 258, 260 presents a more visually perceptible directional or orientation indication for aligning the pinch valves 250 during assembly into the pinch valve housing so that the pinch valves 250 "point" towards the center of the pinch valve housing 72, for example, radially towards the column 100. As another or additional alternative, alignment indicia, for example optional directional arrows 276, may be provided on the outer surfaces 278 of the end flanges 258, 260. The directional arrows 276 may be molded into the pinch valve body 252 or otherwise provided as needed. Note that the directional arrows 276 directionally align with the pointer apex 274.

In an exemplary embodiment, the alignment axes 262, 264 indicate a radial offset included angle α between the end flanges 258, 260 when viewed in plan. Moreover, the alignment axes 262, 264 also indicate a radial offset included angle β between each pointer apex 274 and the rib alignment directional axis 256a. In other words, the alignment profile of the end flanges 258, 260 are not only radially offset from each other but also from the ribs 256.

As noted above, the ribs, when used as part of the pinch valve 250 (or 76 in the embodiment of FIGS. 8A and 8B), are to be aligned with and received in the slots in the pinch valve pressure chamber. In the embodiment of FIGS. 8B and 9, it will be noted that the slots 200 are formed at right angles with respect to the slots 200 in each adjacent pinch valve pressure chamber 74 on either side thereof, as indicated by the lines R (the lines R indicate the rib orientation). Moreover, the slots 200 and the ribs 196 are oriented in a manner similar to what was done in the 878 patent (which discloses a square pinch valve housing), but this results in the ribs 196 partially obstructing the pressure passage 208 in the location or area where the pressure passage 208 opens to the pressure chamber 74, for example when the pinch valve housing 72 is now of a generally compact cylindrical shape.

Figure 9B:
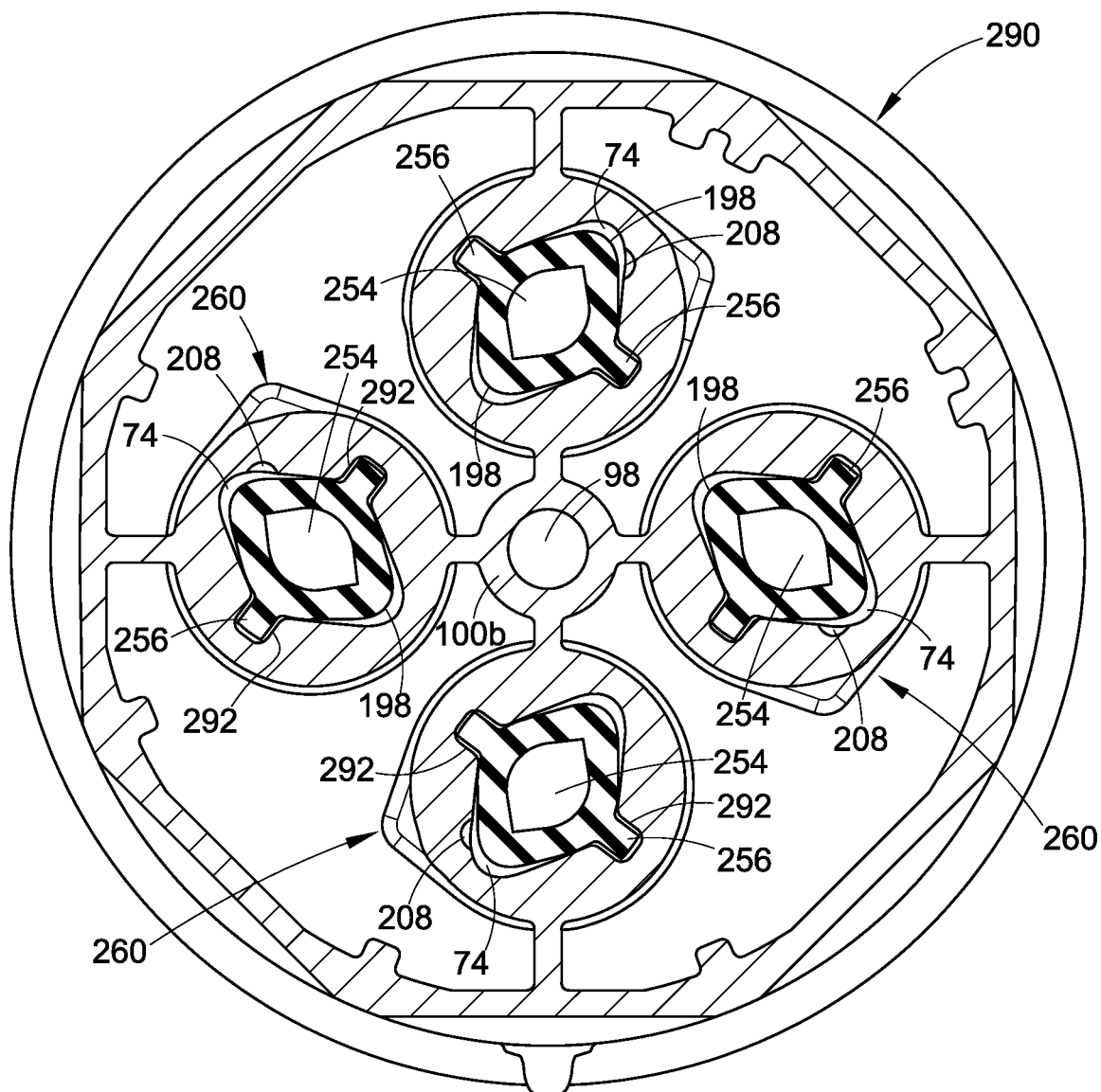

With reference to FIGS. 9A and 9B, in an alternative embodiment for the pinch valve housing 72, a pinch valve housing 290 is provided with slots 292 that receive the pinch valve ribs 256. The slots 292 are radially offset by an angle relative to the location or area where the pressure passage 208 opens to the pressure chamber 74 so that the ribs 256 do not interfere with pressurizing the pressure chamber 74. As an example, the slots 292 may be rotated by approximately 37° away from the where the pressure passage 208 opens to the pressure chamber 74. This moves the ribs 256 out of the way of where the pressure passage 208 opens to the pinch valve pressure chamber 74. Preferably but not necessarily, the pressure passage 208 faces a flatter portion of the pinch valve body that is between the rib 196 and the hinge 198, as this helps compress the pinch valve closed. This is best understood from FIG. 9B. Note that the angle of radial offset between the ribs 256 and the opening of the pressure passage 208 to the pressure chamber 75 will depend on the shape, design, dimensions and so forth of the pinch valve housing 72 as well as the design of the pinch valve 250, particularly the shape of the elliptical portions. Therefore, 37° is but one example of a radial offset that assures that the pressure passage 208 does not open to the pressure chamber 74 in an orientation that would be obstructed by the ribs 256. Moreover, this radial offset between the ribs 256 and the opening of the of the pressure passage 208 to the pressure chamber 74 assures that the pressure chamber 208 does not open to the pressure chamber 74 facing the hinge location 198 (FIG. 9B) because if that were the case then, when the pinch valve is in a closed position, the pinch valve hinge area 198 could obstruct the pressure passage 208 and the pressure passage 208 might not be vented to re-open the pinch valve.

It should also be noted that the pressure passage 208 may be formed at an oblique entry angle θ to the pinch valve pressure chamber 74 as described hereinabove.

As a consequence of the radial offset angle of the rib slots 292 relative to the pressure passage 208, however, a pinch valve 76 that would still use two identically shaped and radially aligned end flanges 194 as in the FIG. 8A embodiment would not provide the correct directional indication using the shaped end flanges (where it is desired that the shaped end flanges "point" to the center of the pinch valve housing 72.) Therefore, for each end flange 258, 260, we radially offset the directional axes 262, 264 of the non-circular end flanges relative to the centerline of the ribs 256 by an included angle β, which in an exemplary embodiment may be 53°. Note that this angle is determined by the radial offset angle between the ribs 256 and the opening of the pressure passage 208 to the pressure chamber 74. This results in the end flanges 258, 260 being radially offset from each other, when viewed in plan such as FIG. 8D, at an included angle α of 74° relative to each other. In other words, the orientation of the pressure chamber 74 (as measured from the plane which bisects the pinch valve ribs) rotates about the longitudinal center axis of the pinch valve housing 72. In an exemplary embodiment of FIGS. 9A and 9B, an angle from the horizontal plane (when viewed from the top as shown in FIGS. 9A and 9B) alternates between 37° and 53° when the angle β is 53°. Since the pinch valve 250 has to be installed in the pressure chamber 74 with the ribs 256 resting in the slots 292 of the pressure chamber 74, the pinch valve 250 orientation is driven by the orientation of the associated pressure chamber 292. Thus, the end flanges 258, 260 are radially offset from each other by the included angle α, to ensure that the pinch valves are always installed correctly with the teardrop or pointer apexes 274 pointing toward the center of the pinch valve housing 72 (regardless of the longitudinal orientation of the pinch valve when it is installed) when the assembly is viewed from the top as in FIG. 9A. The selection of the angle β determines the angle α if it is desired to have the pinch valve 250 installable in either longitudinal orientation. And the selection of the angle β may be made based on the specific needs to pressurizing the pinch valve pressure chamber 74, such as the location where the pressure passage 208 opens to the pressure chamber 74 and the shape and design of the pinch valve 250. Therefore, the exemplary values for α and β as well as the radial offset angle between the ribs 256 and the pressure passage 208 opening to the pressure chamber 74, may be chosen based on the specific geometries of a particular pinch valve housing.

When the single releasable fastener 98 (FIG. 3) is loosened, the pinch valve housing 72 can be separated from the first powder flow block 64 for access to the replaceable components 214 such as the pinch valves 76 and the barrier filter discs 96 and the o-rings 212. These replaceable components can be replaced without any further disassembly of the dense phase pump 12, although optionally the pinch valve housing 72 can be also separated from the second powder flow block 82 when the single releasable fastener 98 is removed. This may be done, for example, if the entire pinch valve housing 72 is to be swapped or replaced with a different pinch valve housing 72. For example, it may be faster in some circumstances to simply replace the pinch valve housing 72 with another having a different set of replaceable components 214 already installed, rather than taking the time to replace the replaceable components 214 in the same pinch valve housing 72. This can further reduce down time for the dense phase pump 12 and allows the replaced pinch valve housing to be refurbished off line. For either technique, it will be noted that the pinch valve housing 72 can be readily accessed for servicing to replace the replaceable components 214 and/or the pinch valve housing 72 itself without having to remove any hoses that are connected to the dense phase pump 12 during normal operation. For example, the pinch valve housing 72 may be serviced without removing the supply hose 92 or the gun hose 94 from the second powder flow block 82 (FIG. 1); or for embodiments in which the 878 type of purge connections are used, without removing the purge air hoses from the check valves.

An exemplary method for replacing one or more replaceable components, for example, the pinch valves 76 or the barrier elements 96 or the seals 212, includes the step of loosening the single releasable fastener 98 so as to release the axial compression between the first powder flow block 64, the pinch valve housing 72 and the second powder flow block 82. The first housing 60 (FIG. 1) can remain attached to the manifold 14 if so desired. As described above, the first powder flow block 64 may be attached to the pump body 62 using the fasteners 80 such as a plurality of bolts. Thus the pinch valve housing 72 may be serviced without separating the first powder flow block 64 from the pump body 62 or the pump body 62 from the manifold 14.

After the single releasable fastener 98 is loosened and separated from the threaded insert 102 (FIG. 4), the pinch valve housing 72 may be axially pulled away or separated from the first powder flow block 64 (note that although the exemplary embodiments illustrate the dense phase pump 12 in a vertical orientation as is done in common practice, such is not required for operation of the pump). Once the pinch valve housing 72 has been separated from the first powder flow block 64, the replaceable components 214, such as one or more of the pinch valves 76, the barrier elements 96 and the seals 212, may be replaced with different or new ones. Alternatively, the pinch valve assembly housing 72 may be further separated from the second powder flow block 82 and wholly replaced, or in some cases it may be easier to service the replaceable components 214 with the pinch valve housing also separated from the second powder flow block 82 as a standalone assembly. After servicing as needed, the dense phase pump 12 can be reassembled by mating up the pinch valve housing 72 with the first powder flow block 64 and the second powder flow block 82 with the pinch valve housing 72 and then tightening the single releasable fastener 98.

Figure 11:
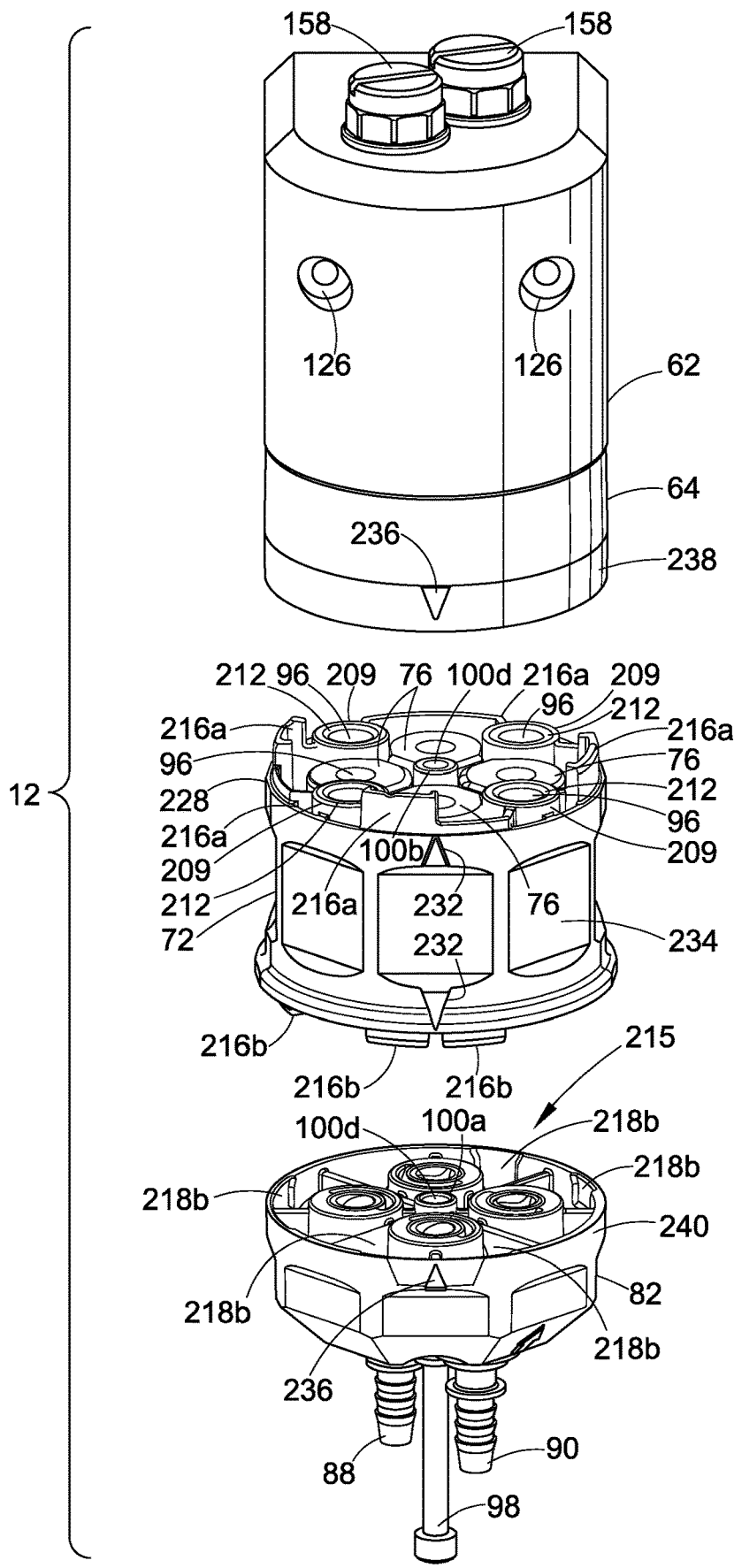
FIGS. 11 and 11A are isometric views of the powder flow blocks and pinch valve housing in a partially rotated view to show an alignment feature.
Figure 11A:
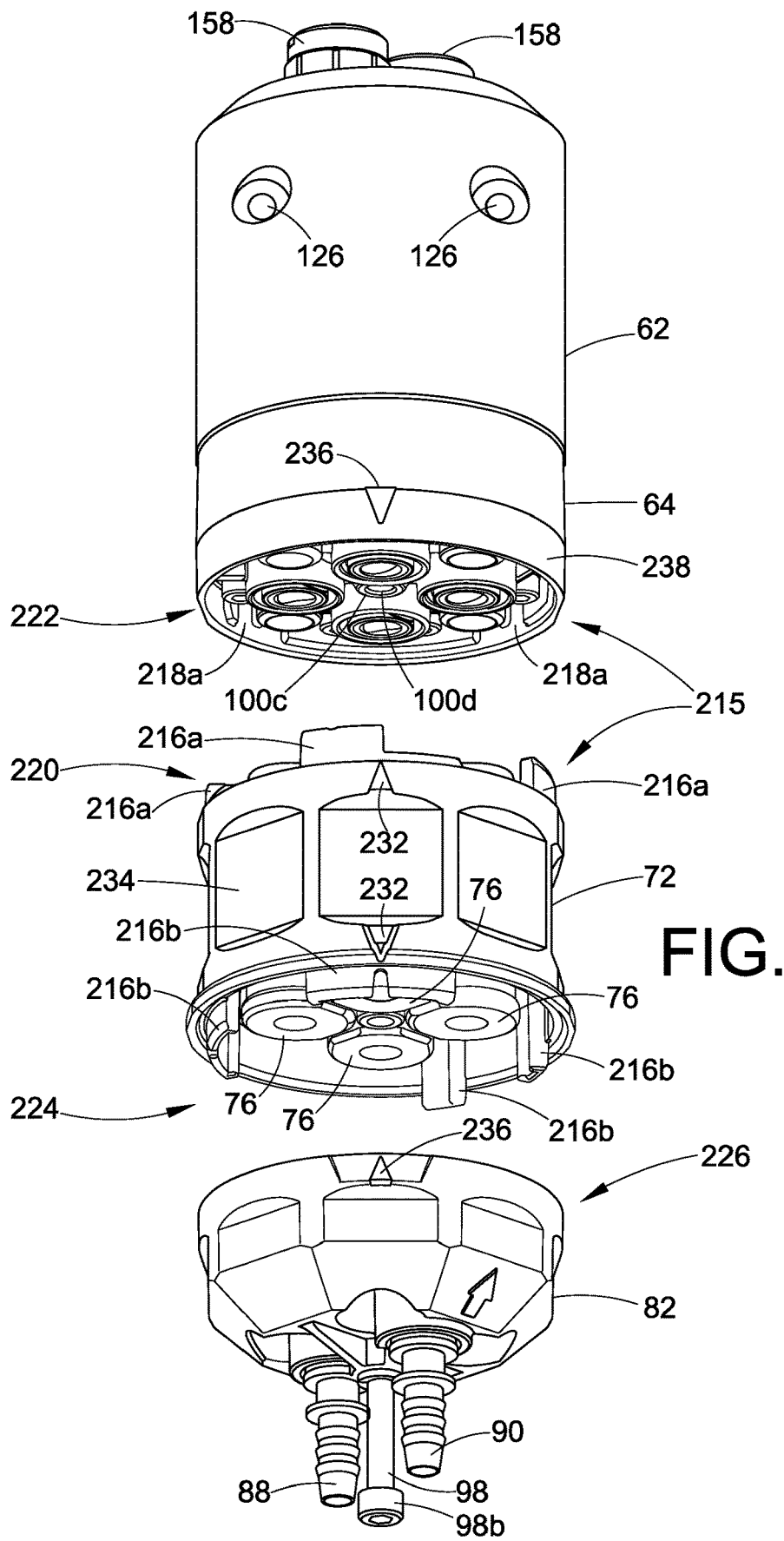

With reference to FIGS. 4, 11 and 11A, in order to facilitate assembly of the dense phase pump 12, alignment structures may be provided. Proper radial alignment, for example, of the pinch valve housing 72 relative to the first and second powder flow blocks 64, 82, assures that the various pneumatic and powder flow passages which extend between these bodies are correctly aligned and sealed. A first alignment concept contemplates keyed elements 215 (FIG. 4) on the attachable bodies so as to assure proper radial alignment. In one embodiment of the keyed elements 215, the pinch valve housing 72 may be provided with one or more extensions or tabs 216 that are circumferentially disposed about the outer periphery of the pinch valve housing 72. These tabs 216 mate with conforming slots 218 that are circumferentially disposed about the outer peripheries of the first and second powder flow blocks 64, 82. Each tab 216a on the pump facing side 220 of the pinch valve housing 72 is received in a conforming slot 218a on the pinch valve facing side 222 of the first powder flow block 64. Similarly, each tab 216b on the opposite facing side 224 of the pinch valve housing 72 is received in a conforming slot 218b on the pinch valve facing side 226 of the second powder flow block 82.

The mating tabs 216 and conforming slots 218 may be disposed slightly radially inward along the outer wall 228 of the pinch valve housing 72 so that the keyed elements 215 are enclosed when the pinch valve housing 72 is assembled with the first and second powder flow blocks 64, 82. The keyed elements 215 may be located elsewhere other than along the outer peripheries if so needed, and may have any suitable shape or geometry. The tabs 216 and the conforming slots 218 may be keyed to each other by having at least one of the tabs 216 and its conforming slot 218 on each side 220, 224 of the pinch valve housing 72 be of a different size or shape than the others. In this manner, the pinch valve housing 72 can be assembled to the first and second powder flow blocks 64, 82 in only one radial orientation and the keyed elements 215 may also be selected so that the pinch valve housing 72 can be assembled in only one axial orientation (for example, only with the first side 220 assembled with the first powder flow block 64 and not upside down). Alternatively, for pinch valve housings that are reversible, the keyed elements 215 need only be designed to provide radial alignment.

It is preferred although not required that the keyed elements 215 also cooperate to restrict relative rotation between the pinch valve housing 72 and the first and second powder flow blocks 64, 82. This may be realized, for example, by providing a close dimensional fit between the tabs 216 and the conforming slots 218 so that the assembled keyed elements 215 restrict relative rotation between the pinch valve housing 72 and the first and second powder flow blocks 64, 82. Whether the close dimensional fit between the tabs and slots amounts to an interference fit is a matter of design choice. Preferably, the close dimensional fit is sufficient to prevent relative rotation between the assembled bodies but not so tight so as to make assembly or disassembly less useful. From these teachings, many other ways to provide a keyed connection and alignment between the assembled bodies 72, 64 and 82 will be readily apparent to those skilled in the art.

The keyed elements 215 may be disposed as needed on the several mating bodies. For example, the tabs 216 may be provided on the first and second powder flow blocks 64, 82 and the slots 218 disposed on the pinch valve housing 72. Another alternative is that all three bodies 72, 64 and 82 may have tabs and slots that cooperate with conforming tabs and slots on the facing sides of the attached bodies.

With reference to FIGS. 1 and 2, the keyed elements 215 restrict the pinch valve housing 72 to being assembled in preferably a single radial position relative to the first and second powder flow blocks 64, 82. Although the differently shaped or sized keyed elements 215 may be visually distinct to an assembler, such may not always be the case. To further aid in the assembly of these bodies prior to tightening the single releasable fastener 98, exterior alignment indicia 230 may be provided. Each of the pinch valve housing 72, the first powder flow block 64 and the second powder flow block 82 may include an exterior alignment indicia 230 that aligns with the adjacent body to indicate correct radial alignment. For example, the exterior alignment indicia may be in the form of one or more directional pointers 232 on the outer surface 234 of the pinch valve housing 72 that align with directional pointers 236 on the respective outer surfaces 238, 240 of the first powder flow block 64 and the second powder flow block 82 when the bodies are radially aligned. The exterior alignment indicia 230 may have any suitable form and appearance. For example, the exterior alignment indicia 230 may be embossed raised surfaces or reliefs on the outer surfaces 234, 238 and 240, or may be applied on labels or printed on, or any other suitable technique may be used as needed. The exterior alignment indicia 230 may be used to assist in the assembly of the dense phase pump 12, and after the pump is assembled and the single releasable fastener 98 tightened, the exterior alignment indicia 230 provide visual confirmation that the pinch valve housing 72 is properly and radially aligned with the first and second powder flow blocks 64, 82.

While various aspects and features and concepts of the inventions are described and illustrated herein as embodied in various combinations in the exemplary embodiments, these various aspects, features and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices and so on may be described herein, such descriptions are not intended to be a complete or exhaustive list of available alternative embodiments, whether presently known or later developed. Those skilled in the art may readily adopt one or more of the aspects, concepts or features of the various inventions into additional embodiments within the scope of the present inventions, even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present inventions however, such values and ranges are not to be construed in a limiting sense and are intended to be critical values or ranges only if so expressly stated. Additionally, even though some features and aspects and combinations thereof may be described or illustrated herein as having a specific form, fit, function, arrangement or method, such description is not intended to suggest that such descriptions or illustrated arrangements are required or necessary unless so expressly stated. Those skilled in the art will readily appreciate additional and alternative form, function, arrangement or methods that are either known or later developed as substitute or alternatives for the embodiments and inventions described herein.

The inventions have been described with reference to the exemplary embodiments. Modifications and alterations will occur to others upon a reading and understanding of this specification and drawings. It is intended to include all such modifications and alterations insofar as they come within the scope of the appended claims or the equivalents thereof.

What is claimed is:

1. A pinch valve, comprising:
   an annular body having a central flow passage therethrough; and
   a first end flange on a first end of said annular body and a second end flange on an opposite end of said annular body,
   said first end flange and said second end flange each having a shaped periphery including a pointer apex for aligning the pinch valve when the pinch valve is installed in a pinch valve body, wherein said pointer apex of said first end flange is radially offset from said pointer apex of said second end flange, and said pointer apexes of said first and second end flanges each define a single radially outermost point that is disposed radially outwards with respect to every other point of the respective first and second end flanges.

2. The pinch valve of claim 1, wherein said first end flange and said second end flange comprise alignment indicia thereon.

3. The pinch valve of claim 1, wherein said first end flange and said second end flange have matching shapes.

4. The pinch valve of claim 1, wherein the pinch valve is installed in a first longitudinal orientation or a second longitudinal orientation that is inverse of said first longitudinal orientation.

5. A pinch valve housing, comprising:
   a body comprising at least one pressure chamber; and
   a pinch valve disposed in said pressure chamber,
   said pinch valve comprising first and second end flanges that each have a non-circular periphery that includes a pointer apex, wherein said pointer apex of said first end flange is radially offset from said pointer apex of said second end flange, and said pointer apexes of said first and second end flanges define a single radially outermost point that is disposed radially outwards with respect to every other point of the respective first and second end flanges.

6. The pinch valve housing of claim 5, further comprising a pressure passage that extends from an inlet port to said pressure chamber, said pressure chamber having a longitudinal axis X, said pressure passage opening to said pressure chamber at an oblique angle θ relative to said longitudinal axis X.

7. The pinch valve housing of claim 5, further comprising alignment indicia on an external surface of said body.

8. The pinch valve housing of claim 5, further comprising a pressure passage having an opening into said pressure chamber.

9. The pinch valve housing of claim 8, wherein said pinch valve comprises ribs that are received in slots in said body, said slots being radially offset by an angle β from said opening.

10. A pinch valve, comprising:
    an annular body having an outer surface, a central flow passage that extends therethrough along a longitudinal axis, and an outer diameter measured perpendicular to the longitudinal axis, wherein the outer diameter of at least a portion of the annular body decreases as the annular body extends along the longitudinal axis when the pinch valve is in an initial open configuration;
    a first end flange on a first end of said annular body and a second end flange on an opposite end of said annular body, wherein each said first end flange and second end flange have a larger outside diameter than said annular body; and
    a pair of ribs aligned along said outer diameter of the annular body and extending longitudinally along opposed sides of said outer surface of said annular body from said first end flange to said second end flange,
    wherein at least one end flange of said first end flange and said second end flange has a radially outer periphery that includes a circular portion and a pair of flat portions, each of the flat portions being circumferentially offset from each of the ribs and tapering toward one another along a direction extending laterally from the longitudinal axis, whereby the radially outer periphery is shaped for aligning the pinch valve when the pinch valve is installed in a pinch valve housing.

11. The pinch valve of claim 10, wherein said first end flange and said second end flange have identical maximum outside diameters.

12. The pinch valve of claim 10, wherein each of said first and second end flanges has an identical size and shape so that the pinch valve can be installed in either of two orientations that are inverse with respect to each other.

13. The pinch valve of claim 10, wherein said first end flange has the radially outer periphery that includes the circular portion and the pair of flat portions, and said second end flange has a second radially outer periphery that includes a second circular portion and a second pair of flat portions, each flat portion of the second pair of flat portions being circumferentially offset from each of the ribs and tapering toward one another along a second direction extending laterally from the longitudinal axis.

14. The pinch valve of claim 10, wherein a thickness of at least a portion of each rib of the pair of ribs increases as each respective rib extends along the longitudinal axis.

15. A method for replacing the pinch valve of claim 10 disposed in a dense phase pump, the method comprising:
    releasing a single releasable fastener to release the pinch valve housing that was attached to a pump housing by said single releasable fastener;
    removing said pinch valve housing from attachment with said pump housing to provide access to said pinch valve disposed in said pinch valve housing; and
    removing said pinch valve for replacement with a different pinch valve.

16. The method of claim 15, further comprising removing at least one barrier element from said pinch valve housing for replacement with a different barrier element.

17. The method of claim 15, wherein said pinch valve can be replaced without disconnecting one or more hoses that are connected to the dense phase pump during normal operation of the dense phase pump.

18. A pinch valve housing, comprising:
    a body comprising at least one pressure chamber;
    a pinch valve disposed in said pressure chamber, the pinch valve comprising:
    an annular body having an outer surface, a central flow passage that extends therethrough along a longitudinal axis, and an outer diameter measured perpendicular to the longitudinal axis, wherein the outer diameter of at least a portion of the annular body decreases as the annular body extends along the longitudinal axis when the pinch valve is in an initial open configuration;

a first end flange on a first end of said annular body and a second end flange on an opposite end of said annular body, wherein each said first end flange and second end flange have a larger outside diameter than said annular body, wherein at least one end flange of said first end flange and said second end flange has a radially outer periphery that includes a circular portion and a pair of flat portions, each of the flat portions tapering toward one another along a direction extending laterally from the longitudinal axis, whereby the radially outer periphery is shaped for aligning the pinch valve when the pinch valve is installed in the body of the pinch valve housing; and a pair of ribs aligned along said outer diameter of the annular body and extending longitudinally along opposed sides of said outer surface of said annular body from said first end flange to said second end flange;

an inlet port defining an outer opening for receiving pressurized air, wherein each of the flat portions are circumferentially offset from each of the ribs;

a pressure passage that extends through said body of the pinch valve housing from said outer opening to said pressure chamber for providing said pressurized air to said pressure chamber to selectively close said pinch valve; and a barrier element disposed in said inlet port.

19. The pinch valve housing of claim 18, wherein said barrier element comprises a barrier filter that comprises a gas permeable material.

20. The pinch valve housing of claim 18, further comprising alignment indicia on an external surface of said body.

21. The pinch valve housing of claim 18, wherein said barrier element is configured to be replaced without disassembling said body of said pinch valve housing.

22. The pinch valve housing of claim 18, wherein a thickness of at least a portion of each rib of the pair of ribs increases as each respective rib extends along the longitudinal axis.

* * * * *